United States Patent
Klein et al.

(10) Patent No.: US 10,528,359 B2
(45) Date of Patent: Jan. 7, 2020

(54) APPLICATION LAUNCHING IN A MULTI-DISPLAY DEVICE

(71) Applicant: Microsoft Technology Licensing, LLC, Redmond, WA (US)

(72) Inventors: Christian Klein, Duvall, WA (US); Robert Joseph Disano, Seattle, WA (US); Paula Julia Chuchro, Seattle, WA (US); Jerome Jean-Louis Vasseur, Bothell, WA (US); Jason Michael Nelson, Redmond, WA (US); Scott David Schenone, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/834,378

(22) Filed: Dec. 7, 2017

(65) Prior Publication Data

US 2018/0329508 A1  Nov. 15, 2018

Related U.S. Application Data

(60) Provisional application No. 62/505,942, filed on May 14, 2017.

(51) Int. Cl.
*G06F 9/4401* (2018.01)
*G06F 1/16* (2006.01)
(Continued)

(52) U.S. Cl.
CPC .......... *G06F 9/4411* (2013.01); *G06F 1/1616* (2013.01); *G06F 1/1641* (2013.01);
(Continued)

(58) Field of Classification Search
None
See application file for complete search history.

(56) References Cited

U.S. PATENT DOCUMENTS

| 5,761,485 A | 6/1998 | Munyan |
| 6,222,507 B1 | 4/2001 | Gouko |
| (Continued) | | |

FOREIGN PATENT DOCUMENTS

| EP | 1538549 | 6/2005 |
| EP | 1868068 A1 | 12/2007 |
| (Continued) | | |

OTHER PUBLICATIONS

"Accessibility Requirements for People with Low Vision", Retrieved from <https://w3c.github.io/low-vision-a11y-tf/requirements.html> on Jun. 7, 2017, Sep. 26, 2016, 25 pages.

(Continued)

*Primary Examiner* — Gustavo Polo

(57) ABSTRACT

Techniques for application launching in a multi-display device are described. In one or more implementations, an apparatus such as a mobile device includes multiple interconnected display devices. According to one or more implementations, techniques described herein enable application launching behavior to be determined based on context information. For instance, based on a determined context condition of a multi-display client device, an application launch behavior is determined and used to launch an application on the client device.

20 Claims, 13 Drawing Sheets

(51) Int. Cl.

| | |
|---|---|
| *G06F 3/14* | (2006.01) |
| *G09G 5/00* | (2006.01) |
| *G09G 5/14* | (2006.01) |
| *G06F 3/01* | (2006.01) |
| *G06F 3/0354* | (2013.01) |
| *G06F 3/041* | (2006.01) |
| *G06F 3/0488* | (2013.01) |
| *G06F 9/445* | (2018.01) |
| *G06K 9/00* | (2006.01) |

(52) U.S. Cl.
CPC .......... *G06F 1/1647* (2013.01); *G06F 1/1677* (2013.01); *G06F 1/1681* (2013.01); *G06F 1/1694* (2013.01); *G06F 3/011* (2013.01); *G06F 3/017* (2013.01); *G06F 3/03545* (2013.01); *G06F 3/0418* (2013.01); *G06F 3/04883* (2013.01); *G06F 3/1446* (2013.01); *G06F 9/4401* (2013.01); *G06F 9/445* (2013.01); *G09G 5/003* (2013.01); *G09G 5/14* (2013.01); *G06F 1/1643* (2013.01); *G06F 3/041* (2013.01); *G06K 9/00154* (2013.01); *G06K 9/00416* (2013.01); *G06K 9/00422* (2013.01); *G09G 2320/0626* (2013.01); *G09G 2320/0686* (2013.01); *G09G 2340/0407* (2013.01); *G09G 2354/00* (2013.01); *G09G 2356/00* (2013.01)

(56) References Cited

U.S. PATENT DOCUMENTS

| | | | |
|---|---|---|---|
| 7,184,025 B2 | 2/2007 | Williams et al. | |
| 7,190,375 B2 | 3/2007 | Dresevic et al. | |
| 7,397,485 B2 | 7/2008 | Miller et al. | |
| 9,092,183 B2 | 7/2015 | Reeves et al. | |
| 9,189,773 B2 | 11/2015 | Webber | |
| 9,224,355 B2 | 12/2015 | Wu et al. | |
| 9,298,282 B2 | 3/2016 | Liberty | |
| 9,406,281 B2 | 8/2016 | Lee | |
| 9,489,080 B2 | 11/2016 | Seo et al. | |
| 9,524,139 B2 | 12/2016 | Aurongzeb et al. | |
| 9,549,060 B2 | 1/2017 | Wohlert et al. | |
| 9,600,595 B2 | 3/2017 | DeLuca et al. | |
| 9,619,008 B2 | 4/2017 | North et al. | |
| 2005/0160371 A1* | 7/2005 | Karson | G06Q 50/22 |
| | | | 715/777 |
| 2005/0270278 A1 | 12/2005 | Ouchi | |
| 2006/0034042 A1 | 2/2006 | Hisano et al. | |
| 2007/0075915 A1 | 4/2007 | Cheon et al. | |
| 2008/0024388 A1 | 1/2008 | Bruce | |
| 2009/0201246 A1 | 8/2009 | Lee et al. | |
| 2009/0303208 A1 | 12/2009 | Case et al. | |
| 2010/0081475 A1 | 4/2010 | Chiang et al. | |
| 2010/0182265 A1 | 7/2010 | Kim et al. | |
| 2010/0225601 A1 | 9/2010 | Homma et al. | |
| 2010/0245106 A1 | 9/2010 | Miller et al. | |
| 2010/0321275 A1 | 12/2010 | Hinckley et al. | |
| 2010/0333041 A1 | 12/2010 | Fabrick | |
| 2011/0074717 A1 | 3/2011 | Yamashita | |
| 2011/0263339 A1 | 10/2011 | Cole et al. | |
| 2011/0304537 A1 | 12/2011 | Eruchimovitch et al. | |
| 2012/0050177 A1 | 3/2012 | Simmons | |
| 2012/0113019 A1 | 5/2012 | Anderson | |
| 2012/0242599 A1 | 9/2012 | Seo et al. | |
| 2012/0266098 A1* | 10/2012 | Webber | G06Q 10/107 |
| | | | 715/778 |
| 2012/0306768 A1 | 12/2012 | Bailey | |
| 2012/0327133 A1 | 12/2012 | Eguchi | |
| 2013/0033415 A1 | 2/2013 | Chang et al. | |
| 2013/0076591 A1 | 3/2013 | Sirpal et al. | |
| 2013/0169564 A1 | 7/2013 | Sano et al. | |
| 2013/0219329 A1 | 8/2013 | Tomimori | |
| 2013/0234929 A1 | 9/2013 | Libin | |
| 2013/0321264 A1 | 12/2013 | Park et al. | |
| 2013/0321340 A1 | 12/2013 | Seo et al. | |
| 2014/0101575 A1 | 4/2014 | Kwak et al. | |
| 2014/0101579 A1* | 4/2014 | Kim | G06F 3/0486 |
| | | | 715/761 |
| 2014/0132514 A1 | 5/2014 | Kuzara et al. | |
| 2014/0145966 A1 | 5/2014 | Gardenfors | |
| 2014/0210737 A1 | 7/2014 | Hwang et al. | |
| 2014/0267176 A1 | 9/2014 | Bathiche et al. | |
| 2014/0267178 A1 | 9/2014 | Bathiche et al. | |
| 2014/0375596 A1 | 12/2014 | Kim et al. | |
| 2015/0116362 A1 | 4/2015 | Aurongzeb et al. | |
| 2015/0116364 A1 | 4/2015 | Aurongzeb et al. | |
| 2015/0212545 A1 | 7/2015 | Ding | |
| 2015/0227225 A1 | 8/2015 | Park et al. | |
| 2015/0234629 A1 | 8/2015 | Park | |
| 2015/0242039 A1 | 8/2015 | Chang et al. | |
| 2015/0261374 A1 | 9/2015 | Eguchi et al. | |
| 2015/0324162 A1 | 11/2015 | Kim et al. | |
| 2016/0011719 A1 | 1/2016 | Andersson | |
| 2016/0034059 A1* | 2/2016 | Graf | G06F 3/041 |
| | | | 345/173 |
| 2016/0041757 A1 | 2/2016 | Sirpal et al. | |
| 2016/0086568 A1 | 3/2016 | Imamura et al. | |
| 2016/0098063 A1 | 4/2016 | Lee et al. | |
| 2016/0249749 A1 | 9/2016 | Bull | |
| 2017/0031434 A1 | 2/2017 | Files et al. | |
| 2017/0038934 A1 | 2/2017 | Sirpal et al. | |
| 2017/0052751 A1 | 2/2017 | Aurongzeb et al. | |
| 2017/0139535 A1 | 5/2017 | Files et al. | |
| 2017/0193489 A1 | 7/2017 | Jeon | |
| 2017/0337025 A1 | 11/2017 | Finnan | |
| 2018/0329508 A1 | 11/2018 | Klein et al. | |
| 2018/0329574 A1 | 11/2018 | Klein et al. | |
| 2018/0330694 A1 | 11/2018 | Klein et al. | |

FOREIGN PATENT DOCUMENTS

| | | |
|---|---|---|
| EP | 2674834 A2 | 12/2013 |
| EP | 3093759 A2 | 11/2016 |
| IN | 2024CHE2014 | 1/2016 |
| WO | 2010028403 A1 | 3/2010 |
| WO | 2015191468 A1 | 12/2015 |

OTHER PUBLICATIONS

Murph, "Kyocera Echo review", https://www.engadget.com/2011/04/13/kyocera-echo-review/, Apr. 13, 2011, 14 pages.

"Acer ICONIA—User Guide", Retrieved From: https://www.manualslib.com/manual/353947/Acer-Iconia-6120.html, Nov. 1, 2010, 110 Pages.

"Windows 10—Wikipedia", Retrieved From: https://www.manualslib.com/manual/353947/Acer-Iconia-6120.html, Jul. 9, 2018, 47 Pages.

"International Search Report and Written Opinion Issued in PCT Application No. PCT/US18/028756", dated Jul. 4, 2018, 13 Pages.

"International Search Report and Written Opinion Issued in PCT Application No. PCT/US18/028775", dated Sep. 13, 2018, 17 Pages.

"Invitation to Pay Additional Fee Issued in PCT Application No. PCT/US18/028775", dated Jul. 6, 2018, 11 Pages.

"International Search Report and Written Opinion Issued in PCT Application No. PCT/US18/028778", dated Jul. 18, 2018, 15 Pages.

"International Search Report & Written Opinion for PCT Patent Application No. PCT/US18/028780", dated Oct. 26, 2018, 17 Pages.

"Invitation to Pay Additional Fee Issued in PCT Application No. PCT/US18/028780", dated Jul. 20, 2018, 10 Pages.

"Non-final Office Action Issued in U.S. Appl. No. 15/797,266", dated Jan. 29, 2019, 22 Pages.

"Non Final Office Action Issued in U.S. Appl. No. 15/685,219", dated Jul. 15, 2019, 11 Pages.

* cited by examiner

APPLICATION LAUNCHING IN A MULTI-DISPLAY DEVICE

RELATED APPLICATION

This application claims priority under 35 U.S.C. § 119(e) to U.S. Provisional Patent Application No. 62/505,942, filed 14 May 2017 and titled "Multi-Display Device Techniques," the entire disclosure of which is incorporated by reference in its entirety.

BACKGROUND

Mobile devices provide today's user with a variety of different functionalities, and in many instances allow the user to directly interact with objects displayed via touch-sensitive display devices. Devices having multiple display surfaces or a single large display surface, however, introduce complexities that are typically not resolved using conventional display management techniques. For instance, a device with multiple display surfaces connected by a hinge can enable the different display surfaces to be placed at different positions relative to one another. Determining how to manage various device functionality is challenging based on the number of available device positions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for application launching in a multi-display device are described. In one or more implementations, an apparatus such as a mobile device includes multiple interconnected display devices. According to one or more implementations, techniques described herein enable application launching behavior to be determined based on context information. For instance, based on a determined context condition of a multi-display client device, an application launch behavior is determined and used to launch an application on the client device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for application launching in a multi-display device are described. In one or more implementations, an apparatus such as a mobile device includes multiple interconnected display devices. The apparatus, for instance, includes two (or more) display devices connected by a hinge such that the display devices can be positioned at different angles relative to one another. Generally, this supports different usage scenarios of the apparatus.

An apparatus with multiple display devices introduces a number of challenges from a resource usage perspective. For instance, multiple display devices typically utilize more computing resources than single devices, such as processor bandwidth and memory to manage input and output to multiple display devices in contrast with a single display device. Techniques described herein mitigate these issues while providing an enhanced user experience for launching applications on a multi-display device.

For instance, techniques described herein enable application launching behavior to be determined based on context information. For instance, based on a determined context condition of a multi-display client, an application launch behavior is determined and used to launch an application on a particular display. In at least one implementation, affinity between applications can be used to determine how to launch an application and/or group of applications, such as whether to present a set of applications as a complementary experience or an alternative experience. Generally, the different ways of determining and applying launch context are performed automatically based on different detected device-related contexts. This conserves power and processing resources by reducing a number of user interactions and resulting processor tasks required for presenting applications in an appropriate context on a multi-display device.

In the following discussion, an example environment is first described that is operable to employ techniques described herein. Next, a section entitled "Example Implementation Scenarios" describes some example implementation scenarios in accordance with one or more implementations. Following this, a section entitled "Example Procedures" describes some example procedures in accordance with one or more implementations. Finally, a section entitled "Example System and Device" describes an example system and device that are operable to employ techniques discussed herein in accordance with one or more implementations.

Having presented an overview of example implementations in accordance with one or more implementations, consider now an example environment in which example implementations may by employed.

Example Environment

Figure 1:
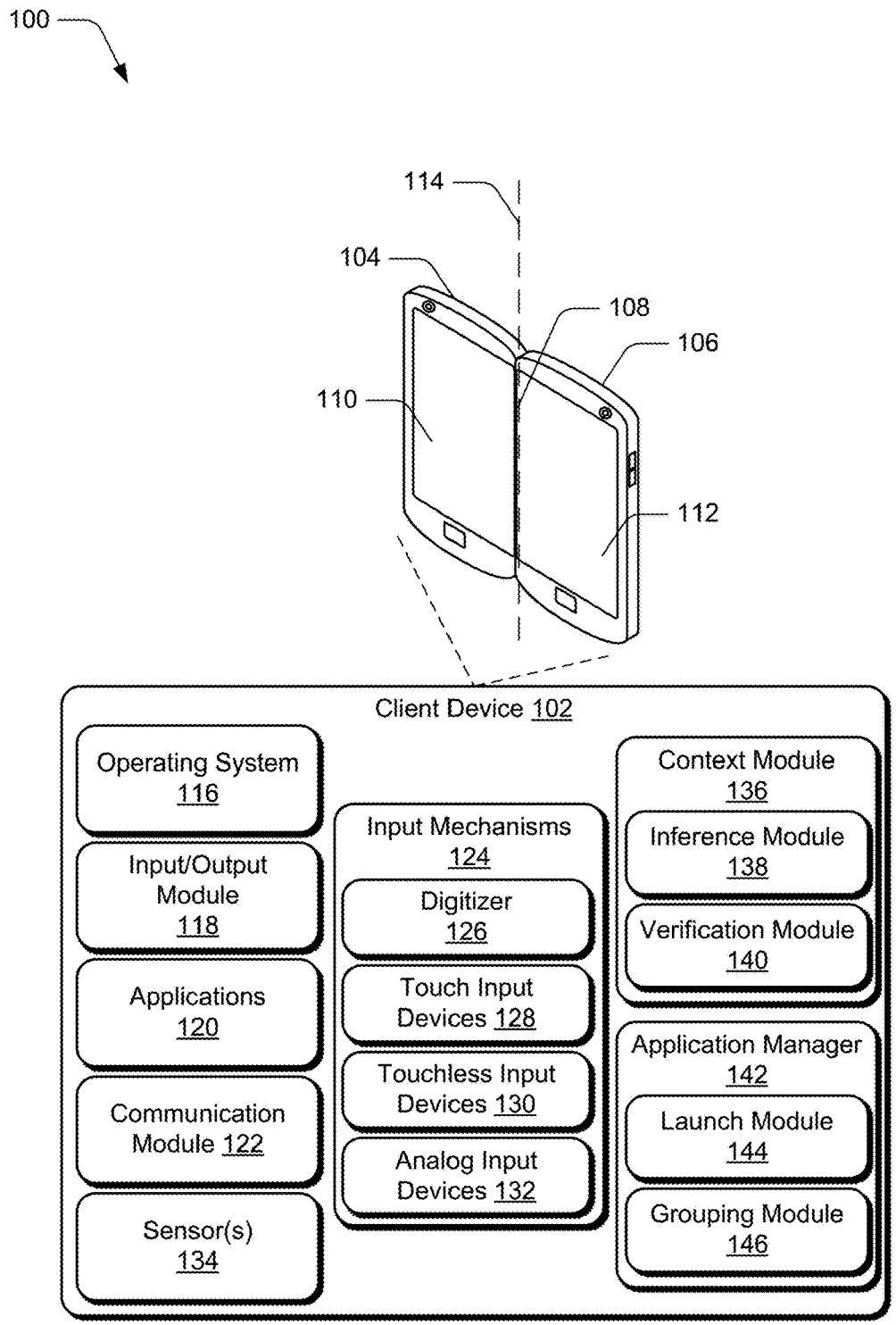
FIG. 1 is an illustration of an environment in an example implementation that is operable to employ the techniques described herein in accordance with one or more implementations.

FIG. 1 is an illustration of an environment 100 in an example implementation that is operable to employ techniques for application launching in a multi-display device discussed herein. The environment 100 includes a client device 102 which can be configured in various ways. In at least one implementation, the client device 102 is configured for mobile use, such as a mobile phone, a tablet computer, a wearable device, a handheld gaming device, a media player, and so on. The client device 102 includes a display device 104 and a display device 106 that are connected to one another by a hinge 108. Further, the display device 104 includes a touch surface 110, and the display device 106 includes a touch surface 112.

According to various implementations, the display devices 104, 106 generally represent functionality for visual output for the client device 102. Additionally, the display devices 104, 106 represent functionality for receiving various types of input, such as touch input, stylus input, touchless proximity input, and so forth via one or more of the touch surfaces 110, 112, which can be used as visual output portions of the display devices 104, 106.

Generally, the hinge 108 is configured to rotationally move about a longitudinal hinge axis 114 of the hinge 108 to allow an angle between the display devices 104, 106 to change. In this way, the hinge 108 allows the display devices 104, 106 to be connected to one another yet be oriented at different angles and/or planar orientations relative to each other. In at least some implementations, the touch surfaces 110, 112 may represent different portions of a single integrated and continuous display surface that can be bent along the hinge 108. Thus, the hinge 108 may represent a separate component that hingeably attaches the two separate touch surfaces 110, 112, or the hinge 108 may represent a portion of a single integrated display surface that includes the touch surfaces 110, 112 and about which the touch surfaces 110, 112 can bend.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 13.

The client device 102 includes a variety of different functionalities that enable various activities and tasks to be performed. For instance, the client device 102 includes an operating system 116, an input/output module 118, applications 120, and a communication module 122. Generally, the operating system 116 is representative of functionality for abstracting various system components of the client device 102, such as hardware, kernel-level modules and services, and so forth. The operating system 116, for instance, can abstract various components (e.g., hardware, software, and firmware) of the client device 102 to enable interaction between the components and applications running on the client device 102.

The input/output module 118 is representative of functionality to enable the client device 102 to receive and process input, and to provide different forms of output. The applications 120 are representative of functionality for performing different tasks via the client device 102. Examples of the applications 120 include a word processing application, a spreadsheet application, a web browser, a gaming application, and so forth. The applications 120 may be installed locally on the client device 102 to be executed via a local runtime environment, and/or may represent portals to remote functionality, such as cloud-based services, web apps, and so forth. Thus, the applications 120 may take a variety of forms, such as locally-executed code, portals to remotely hosted services, and so forth.

The communication module 122 is representative of functionality for enabling the client device 102 to communicate over wired and/or wireless connections. For instance, the communication module 122 represents hardware and logic for communicating data via a variety of different wired and/or wireless technologies and protocols.

To enable various types of input to be received and utilized, the client device 102 includes input mechanisms 124. Generally, the input mechanisms 124 represent different functionalities for receiving input to the client device 102, and include a digitizer 126, touch input devices 128, touchless input devices 130, and analog input devices 132. Examples of the input mechanisms 124 include gesture-sensitive sensors and devices (e.g., such as touch-based sensors), a stylus, a touch pad, accelerometers, a microphone with accompanying voice recognition software, and so forth.

The digitizer 126 represents functionality for converting various types of input to the touch input devices 128, the touchless input devices 130, and the analog input devices 132 into digital data that can be used by the client device 102 in various ways. Generally, the touch input devices 128 represent functionality for receiving touch input to the client device 102. Examples of the touch input devices include the display devices 104, 106, the hinge 108, the touch surfaces 110, 112, a touch pad, and so forth. The touch input devices 128, for instance, may be separate or integral with the display devices 104, 106, with integral examples including gesture-sensitive displays with integrated touch-sensitive sensors. The touchless input devices 130 generally represent functionality for detecting input that does not involve physical contact with the client device 102, such as a camera for detecting touchless gestures, proximity detection via capacitance sensing, and so forth.

The analog input devices 132 represent hardware mechanisms of the client device 102 that are usable to generate different physical quantities that represent data that can be interpreted as input to the client device 102. Examples of input that can be detected via the analog input devices 132 include angle of the display devices 104, 106 relative to one another, a position in which a user grips the client device 102, a position of the client device 102 relative to gravity, and so forth. The client device 102, for instance, includes sensors 134 that can be leveraged to implement the analog input devices 132. Generally, the sensors 134 represent functionality for detecting different physical phenomena relative to the client device 102.

The sensors 134 include functionality for detecting various phenomena, such as motion sensors and/or orientation sensors, examples of which include accelerometers and/or gyroscopes configured to detect physical movement and orientation of the display devices 104, 106 in space or relative movement and orientation with respect to a reference position. Further, the sensors 134 can include proximity sensors to detect a proximity of the user to one of the display devices 104, 106. The sensors 134 may also include audio sensors (e.g., a microphone and/or microphone array) to detect audio associated with an audio source (e.g., the user), such as voice commands issued by the user, and the audio can be used to determine a relative direction of the user with respect to the display devices 104, 106 and which of the display devices 104, 106 is substantially facing the user. Additionally, the sensors 134 can include grip sensors, such as touch sensors, configured to detect how a user is holding the client device 102. Accordingly, a variety of different sensors 134 disposed on each of the display devices 104, 106 and can be implemented to detect various different types of digital and/or analog input.

In at least one implementation, one or more sensors 134 can measure a hinge angle of the hinge 108, and the digitizer 126 can convert such measurements into digital data usable by the client device 102 to perform various actions. For example, the sensors 134 can include one or more hinge sensors configured to detect a hinge angle between the display devices 104, 106. Thus, the hinge 108 can be leveraged as a mechanism to generate input data by measurement of a physical variable, such as hinge angle of the hinge 108.

Further to techniques for application launching in a multi-display device described herein, the client device 102 includes and/or makes use of a context module 136, which includes an inference module 138 and a verification module 140. The context module 136, for example, is included as part of an application or system software, such as the operating system 116. Alternatively, the context module 136 represents a different standalone application or other functionality.

The context module 136 represents functionality for determining a state of the client device 102 based on various factors such as device posture, user interaction with the client device 102, application state, system state, and so forth. As discussed herein, "device posture" generally refers to a physical orientation of the client device 102, such as a relative angle of the display devices 104, 106 to one another, a rotational angle of the hinge 108, an orientation of the client device 102 relative to gravity (e.g., to a gravitational vector), and so forth.

In addition to determining a state of the client device 102, the context module 136 represents functionality for ascertaining, based on state conditions of the client device 102, how to configure functionality of the display devices 104, 106. For instance, the context module 136 can utilize various types of state information to configure one or more of the display devices 104, 106 as output primary or secondary, input primary or secondary, or sensor primary or secondary.

To assist the context module 136, the inference module 138 represents functionality for inferring a user's intended primary and/or secondary display for input and/or output purposes. The inference module 138, for instance, is configured to utilize input signals, such as those detected by the input mechanisms 124 and/or the sensors 134, to determine a state of the client device 102 based on an orientation and a relative position of the client device 102 relative to the user, the ground, or another reference location, to make such an inference. Alternatively or additionally, the inference module 138 determine a state of the client device 102 based on functionality executing on the client device 102 (e.g., an application 120), user interaction with and/or proximity to the client device 102, and so forth.

The verification module 140 is representative of functionality to validate and/or verify decisions of the inference module 138 concerning a state of the client device 102. In at least one implementation, the verification module 140 is configured to utilize various sensor signals from the sensors 134 to determine context information associated with the client device 102 in relation to the user and how the user is using the device. In addition, the verification module 140 can use the context information to verify a gesture being performed and/or to verify the inference made by the inference module 138. By verifying the gesture being performed, the inference module 138 can avoid inadvertent or unintentional input being recognized as a gesture. In addition, by verifying whether the inference module 138 correctly determined which of the display devices 104, 106 is to be used as output primary/secondary and/or input primary/secondary, inference errors can be identified and corrected. Thus, the user's experience can be improved over conventional techniques by automatically determining and configuring a display device as output primary/secondary, or input primary/secondary, without requiring the user to explicitly select the primary display.

Further to techniques for application launching in a multi-display device described herein, the client device 102 includes an application manager module ("application manager") 142 with a launch module 144 and a grouping module 146. The application manager 142 represents functionality for controlling various behaviors of the applications 120. For instance, the application manager 142 can leverage the launch module 144 to determine, based on a particular context identified by the context module 136, how to launch an application 120 and/or a set of applications 120. As another example, the application manager 142 can leverage the grouping module 146 to aggregate different instances of the applications 120 together into application groups. The grouping module 146, for example, can utilize explicit and/or implicit behaviors recognized by the context module 136 to create groups of applications that can be launched together. Further discussion of this and other features is provided below.

Having described an example environment in which the techniques described herein may operate, consider now a discussion of some example implementation scenarios in accordance with one or more implementations.

Example Implementation Scenarios

This section describes some example implementation scenarios for application launching in a multi-display device in accordance with one or more implementations. The implementation scenarios may be implemented in the environment 100 described above, the system 1300 of FIG. 13, and/or any other suitable environment. The implementation scenarios and procedures, for example, describe example operations of the client device 102.

Figure 2:
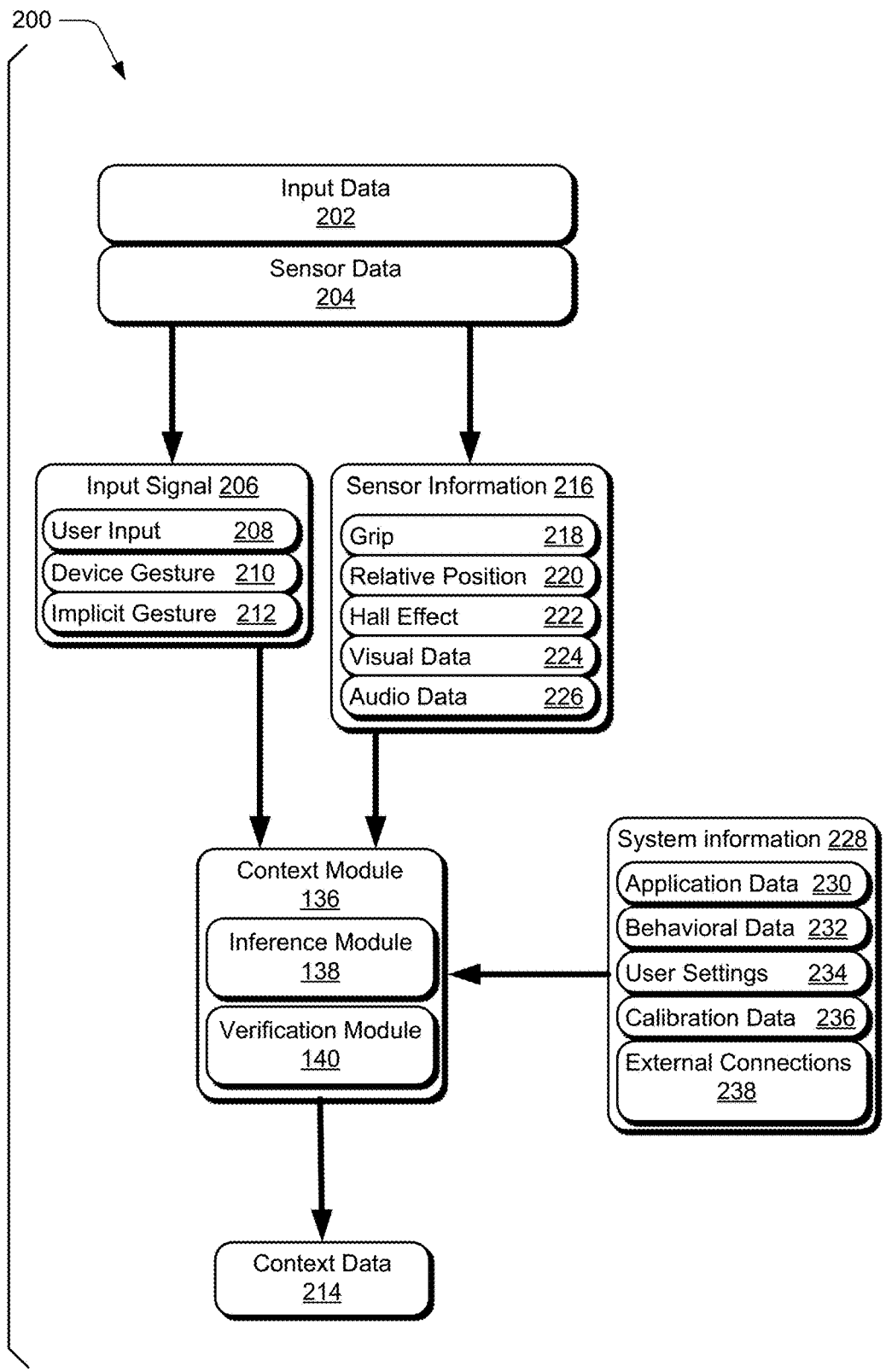
FIG. 2 depicts an example implementation scenario for using context information to determine an application-related context in accordance with one or more implementations.

FIG. 2 illustrates an example implementation scenario 200 for using context information to determine an application-related context for the client device 102. In the illustrated example, input data 202 and/or sensor data 204 is used to generate an input signal 206. Generally, the input data 202 and/or the sensor data 204 represent data generated by the input mechanisms 124 and/or the sensors 134. The input signal 206 can be detected from a variety of different types of input, such as a touch input (e.g., via a finger press or stylus input) to the touch surface 110 or the touch surface 112 of the client device 102, a press of a hardware button, a bend in the hinge 108 of the client device 102, a voice command via an audio sensor, or any combination of input mechanisms.

In implementations, the input signal 206 can include a user input 208, a device gesture 210, and/or an implicit gesture 212. The user input 208 represents any suitable type of intentional input from a user, such as a touch input to the display device 104 and/or the display device 106, voice input, and/or input via some other input mechanism 124 and/or sensor 134. The device gesture 210 is recognized as a physical movement of at least one of the display devices 104, 106 of the client device 102. For instance, the physical movement leverages the hinge 108 such that a hinge angle between the display devices 104, 106 is changed. The user, for example, may open the client device 102 from a closed posture, or further open the client device 102 from an open posture to a flipped posture where the display devices 104, 106 face away from each other in opposite directions. Alternatively, if the client device 102 is in the flipped posture, the user may turn or flip the device over to see the opposite side, which includes a display device that was previously facing away from the user and is now facing toward the user. In at least one implementation, the device gesture 210 represents a type of the user input 208.

The implicit gesture 212 may include physical movement of the client device 102 by the user where the user's intent is not to provide explicit input via the implicit gesture 212, but rather the user is doing something naturally with the client device 102 that can be recognized and detected as a gesture from the system's point of view. For instance, the user may lift the client device 102 from a stationary location (e.g., on a table, or in a pocket), or turn the device to cause a display device to face away from the user and toward another person. From a system point of view, these actions can be considered to be gestures for input, even though the user may not explicitly intend them to be gestures.

Generally, the context module 136 can utilize the input signal 206 to determine device context data ("context data") 214 for the client device 102, and the context data 214 can be used for various purposes. The context data 214, for instance, can be used to determine how to launch a particular application 120, such as which display device 104, 106 to use to launch the application 120. Further, the context data 214 can be leveraged to determined which applications 120 to launch together and/or how to group particular instances of the applications 120.

Alternatively or additionally to the input signal 206, sensor state information ("sensor information") 216 can be leveraged by the context module 136 to determine the context data 214. The sensor information 216 can be determined based on a variety of signals that can be interpreted as state related to the client device 102 and/or a user. In at least some implementations, the sensor information 216 allows the system to refine the context data 214.

The sensor information 216 can include data or signals associated with various device-related phenomena, such as one or more of grip 218, relative position 220, hall effect 222, visual data 224, and audio data 226. This is not an exhaustive list. Rather, these types of sensor information 216 are described as examples, and are not to be construed as limiting. Further, the client device 102 can utilize some or all of the sensor information 216, and can use any subset or combination of different types of the sensor information 216.

The grip 218 indicates how the user is grasping or holding the client device 102 during and/or after the input signal 206. For instance, the grip 218 can be detected by the sensors 134, such as capacitive strips on the outside of the client device 102 or separate capacitive sensors on the rear exterior of the client device 102. Alternatively or in addition, the grip 218 can be detected based on a capacitance of a display surface on the front of the client device 102. In at least one implementation, the sensors 134 can detect whether the user has fingers wrapped around the client device 102, which hand (e.g., left or right hand) the user is using to hold the client device 102, in which of a variety of different device postures the user is holding the device, and so on. Accordingly, the grip 218 indicates how the user is holding the device, which is usable to infer how the user intends to use the device.

The relative position 220 refers to a relative position of the client device 102 in relation to the user of the client device 102, in relation to the ground (e.g., relative to a gravitation vector), and/or in relation to another reference location. For example, the relative position 220 can indicate whether the client device 102 is resting on a surface or whether a display device is facing the user. In implementations, the relative position 220 can be used to determine a current posture of the client device 102. Various types of sensors 134 can be employed to determine the relative position 220, including cameras, accelerometers, magnetometers, and so on.

The hall effect 222 refers to the production of a potential difference across an electrical conductor when a magnetic field is applied in a direction perpendicular to that of the flow of current. Hall effect sensors (e.g., magnetometer) can detect magnetic fields in close proximity. In implementations, the hall effect 222 can be used to detect when the client device 102 is opened from a closed posture to an open posture and to automatically turn on one or both of the display devices 104, 106. Alternatively or additionally, the hall effect 222 can be used to turn the display devices 104, 106 off when the client device 102 is manipulated into the closed posture.

The visual data 224 refers to information captured via an image capturing device, such as a camera of the client device 102. For example, the client device 102 can include multiple integrated cameras as examples of the sensors 134. Each display device 104, 106, for instance, can be associated with one or more cameras, such as front-facing or rear-facing cameras. The cameras can capture images and/or video to detect whether a corresponding display device is facing the user. In implementations, the cameras can be used to detect whether the user is looking at a particular display device.

The audio data 226 represents information captured via an audio sensor, such as a microphone instance of the sensors 134. Examples of the audio data 226 include spoken words and/or commands from a user, incidental noise, environmental noise, and so forth. Where the audio data 226 includes a spoken command from a user, the audio data 226 can be used by the context module 136 to directly infer a user's intent, such as the user's intended use of the client device 102. In scenarios where the audio data 226 includes incidental and/or environmental noise, the audio data 226 can be used by the context module 136 to infer information about a surrounding environment. For instance, if the audio data 226 indicates that there is little noise in the surrounding environment (e.g., based on low detected noise signal), the context module 136 can determine that the context data 214 is to reflect a low noise state. If the audio data 226 indicates, however, a high level of noise (e.g., crowd noise, traffic noise, and so forth), the context module 136 can determine that the context data is to reflect a higher noise state. In at least one implementation, an application context for application launching and/or grouping can correspond to a relative noise state.

Additionally or alternatively to the input signal 206 and the sensor information 216, the context module 136 can utilize system state information ("system information") 228 to determine the context data 214. Generally, the system information 228 includes various attributes of a logical and/or functional state of the client device 102 at any given time. Examples of the system information 228 include application data 230, behavioral data 232, user settings 234, calibration data 236, and external connections 238.

The application data 230 represents application state information for various instances and groups of the applications 120. In at least one implementation, the application data 230 indicates whether a particular application is "output primary" or "input primary." An output primary application represents an application that is designated as primary for purposes of content output, such as for output of video, images, text content, audio content, web content, and so forth. Examples of an output primary application include a video player, an image viewer, a web browser, and so forth.

An input primary application generally represents an application that is designated as primary for purposes of receiving input, such as user input via the input mechanisms 124. Examples of an input primary application include a word processor, a notetaking application, a spreadsheet application, and so forth. According to one or more implementations, an input primary application is not an output primary application, and an output primary application is not an input primary application. However, in certain instances, a particular application can be both output primary and input primary.

The application data 230 may include other application-related information, such as identities and/or application types for one or more applications 120 that are open on the client device 102, settings for instances of the applications 120, user preferences for specific instances of the applications 120, and so forth. The application data 230 may also be display specific, such as which application 120 is open on which particular display device 104, 106.

The behavioral data 232 is representative of how the user tends to interact with the client device 102 or particular applications executed on the client device 102. For example, when using the client device 102 in a posture that allows the user to view both the display devices 104, 106 simultaneously, the user may tend to run certain applications on the left side (e.g., display device 104) and other applications on the right side, e.g., display device 106. In another example, the user may generally take notes on the right side (e.g., display device 106) of the client device 102 because the user is right-handed, and as a result, the user's hand does not obscure the other display device, e.g., display device 104.

There are many different reasons why a user may have particular preferences related to how the user tends to use the client device 102. The behavioral data 232, although it may not explicitly represent preferences in the form of settings, includes behavioral information about how the user uses the device. Further, using the behavioral data 232, some user actions can be anticipated. For example, when a notetaking application is launched, the system can use the behavioral data 232 to launch the notetaking application via a particular one of the display devices 104, 106 because the system knows the user has a preference for viewing the notetaking application via the particular display device and that the user likely intends that particular display device to be the input primary display.

The user settings 234 can indicate how the user prefers to use the client device 102, particularly with respect to ergonomics-related user settings that are set by the user or by default. Ergonomics-related user settings can be used to further refine the input signal 206 (e.g., left/right handedness can be used to predict a likely flip direction, or hand size information can be used for more reliable grip detection). By using information associated with the user settings 234, the client device 102 can predict which direction the user is going to turn the device when the user's intent is to flip it over. This functionality can be useful in differentiating situations that are similar in nature, such as a first situation where the user rotates the client device 102 90 degrees to see the reverse side, versus a second situation where the user rotates the client device 102 90 degrees to show a friend content displayed via the primary display. In the first situation, the primary display can be changed to the reverse side to enable the user to view content via the reverse side. In the second situation, however, the user may not desire the primary display to change but may instead desire the primary display to temporarily face away from the user in order to show the displayed content to the friend, likely with the intent of then turning the device back around to continue viewing the original primary display. Accordingly, the user settings 234, alone or in combination with other system information 228 and/or sensor information 216, can be used to disambiguate similar situations.

The calibration data 236 describes information about the user, such as user properties that the system is aware of. For example, the calibration data 236 can include hand dimensions representing the size and shape of the user's hand(s) that is grasping the client device 102. The hand dimensions can be used for more reliable grip detection. Further, the hand dimensions can be used to identify the user, the user's handedness (left or right), a shape of the user's fingers, and so on. This information can allow the system to more robustly detect how the user is holding the device, which can then be used to infer which display device is likely intended to be the output primary display and/or the input primary display based on the way the user would predictably perform the device gesture 210 or the implicit gesture 212.

The external connections 238 refer to current and/or available connections between the client device 102 and one or more external devices. For example, the client device 102 can be connected to one or more external displays to display content, such as to give a presentation to a group of people. In this example, attention is given to the external device rather than the client device 102. Thus, the external device is likely intended to be the output primary display, whereas one or more of the display devices 104, 106 of the client device 102 are likely intended to be the input primary display.

Accordingly, the inference module 138 can utilize one or more of the input signal 206, the sensor information 216, and/or the system information 228 to generate the context data 214. Further, the verification module 140 is configured to use the sensor information 216 and/or the system information 228 to refine the determination of the context data 214 made by the inference module 138.

In at least one implementation, the application manager 142 is configured to use the context data 214 to infer an output primary display and/or an input primary display, such as for launching a particular application 120. For instance, the context data 214 can indicate which of the display devices 104, 106 the user intends to be employed as an output primary display and/or an input primary display. The launch module 144 can utilize this information to cause an application 120 to launch on an appropriate display.

In an example implementation, one of the display devices 104, 106 can be designated using the context data 214 as a primary display for one purpose, and a secondary display for another purpose. For instance, the context data 214 can indicate that a particular display device is a primary display for purpose of receiving input to the client device 102, but is a secondary display for purpose of displaying output from the client device 102. Thus, the display device can be optimized for input and output characteristics of the display may be configured to deprioritize output. This information can be used for various purposes, such as for determining which display device to use to display a particular application 120. Further aspects for leveraging a division between primary and secondary purposes are detailed below.

In another example implementation, the sensors 134 can be controlled based on which display device 104, 106 is designated as primary/input primary, and which display device 104, 106 is designated as secondary/input secondary. For instance, in a display device that is designated as input primary, sensors 134 that are physically positioned within and/or adjacent the display device can be prioritized over other sensors 134 that are positioned within and/or adjacent a different display device that is designated as input secondary. Sensors 134 that that are positioned on a display device that is input secondary, for instance, can be tuned down and/or turned off to reduce power consumption. In at least one implementation, when a particular display device 104, 106 is designated as sensor primary, an application 120 that utilizes sensor data can be launched on the particular display device to enable the application 120 to access the sensor data from the sensor primary display.

Further, in some implementations, different sensors 134 can be used in different implementations based on which gesture is detected, rather than using all the sensors 134 all the time. This can reduce power consumption and extend battery life. For instance, when the user flips the client device 102 over to view the reverse side, certain sensors (e.g., proximity sensors) can be considered for inferring the user's intended primary display. In contrast, when a different gesture is performed, such as a gesture that opens the client device 102, the system can rely less on the proximity sensors and more on grip sensors. For instance, different sensor signals can be weighted differently based on different gestures. Accordingly, the client device 102 can determine, during performance of the gesture, which gesture is being performed and based on that determination, consider particular sensor signals to refine that determination (e.g., to verify that the determined gesture is in fact being performed). Conditionally considering signals from various sensors 134, rather than simply using all the sensors 134 all the time, reduces required processing bandwidth and power consumption, which can lead to a longer battery charge life.

In one or more implementations, the grouping module 146 may group instances of the applications 120 using the context data 214. For instance, the grouping module 146 can determine that in certain contexts, a user has historically launched a particular set of applications. Thus, when the context data 214 indicates such a context, the particular group of applications can be automatically launched in response to detecting that the particular context occurs. Accordingly, the context data 214 can be aggregated in various ways and used for various purposes according to techniques for application launching in a multi-display device.

Figure 3:
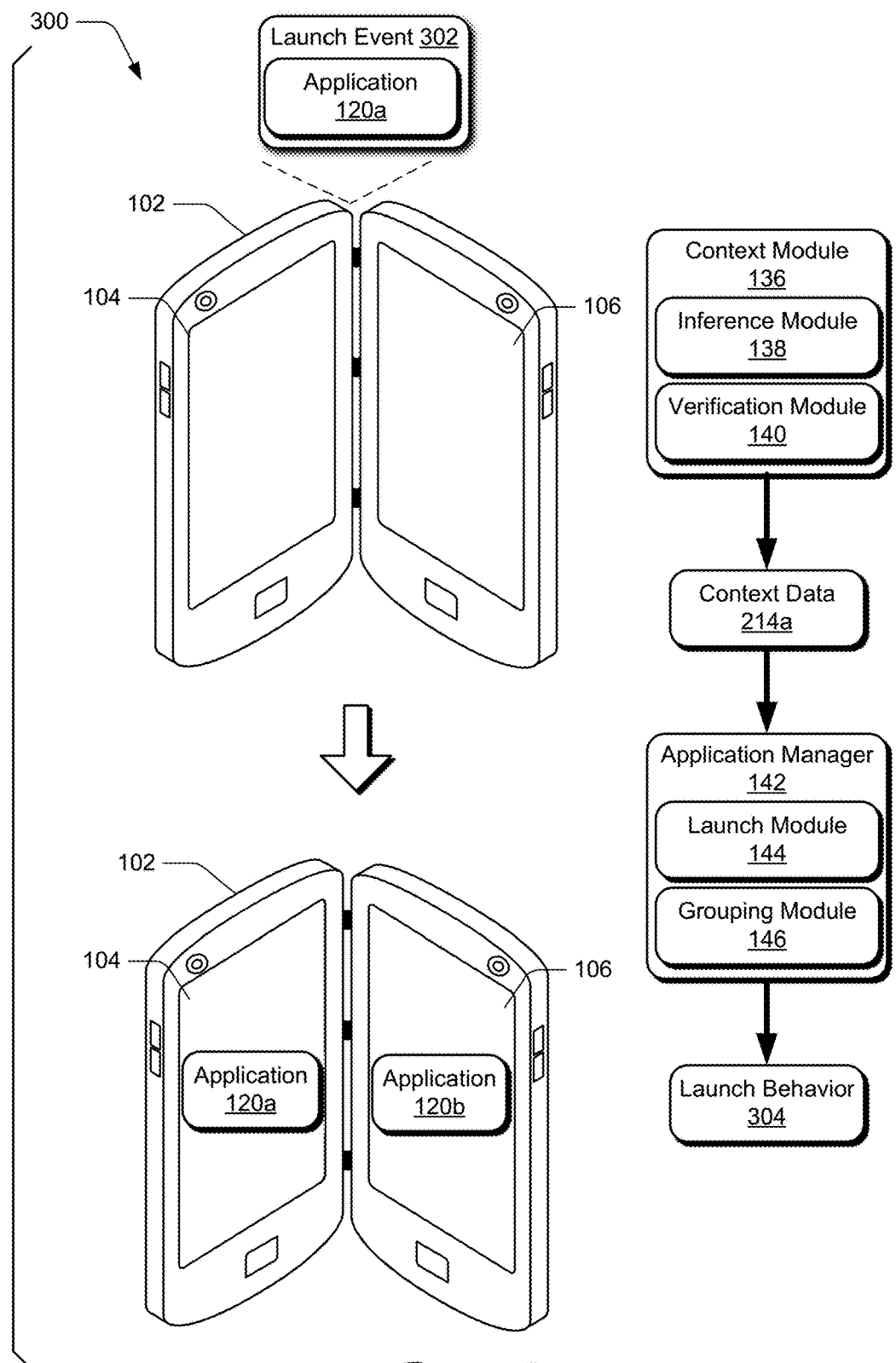
FIG. 3 depicts example implementation scenarios for application launching in a multi-display device in accordance with one or more implementations.

FIG. 3 depicts an example implementation scenario 300 for application launching in a multi-display device as described herein. The scenario 300 includes an instance of the client device 102. In the upper portion of the scenario 300, a launch event 302 occurs to initiate launching of an application 120a on the client device 102. In at least one implementation, the launch event 302 occurs based on an explicit action by a user to launch the application 120a, such as user input requesting launch of the application 120a. Examples of user input to request launching the application 120a include user selection of an application icon displayed on the client device 102, audio input requesting application launch, a gesture recognized by the client device 102 requesting application launch, and so forth.

Alternatively or additionally to an explicit user action, an implied launch action can be recognized by the launch module 144 as an action to launch the application 120a. Examples an implied launch action are discussed above with reference to the implicit gesture 212.

Proceeding with the scenario 300, the launch module 144 determines a launch behavior 304 based on the context data 214. Generally, the launch behavior 304 represents data that is used to determine how to launch the application 120a on the client device 102. The launch behavior 304, for instance, indicates which of the display devices 104, 106 is to be used to launch the application 120a, and/or how the application 120a is to be visually presented relative to a different application 120 on the client device 102. Examples of the launch behavior 304 include:

Application Launch Based on Input Primary and/or Output Primary Display—depending on an input or output characteristic of an application, the application can be launched on a particular display. For instance, consider an example where the display device 104 is designated as output primary, and the display device 106 is designated as input primary. If the application 120a is considered to be output primary, the launch behavior 304 can specify that the application 120a is to be launched on the display device 104. If the application 120a is considered to be input primary, however, the launch behavior can specify that the application 120a is to be launched on the display device 106.

User Behavior—past user behaviors can be used to determine how to launch the application 120a. For instance, if a user has provided input moving the application 120a to the display device 104 in the past, the context module 136 can store this as behavioral data that can be used as the launch behavior 304 and as part of a subsequent application launch scenario. Thus, when the application 120a is subsequently launched, the launch behavior 304 can indicate that the application 120a is to be launched on the display device 104.

Application Affinity—an affinity of the application 120a to other applications 120 on the client device 102 can be used to determine the launch behavior 304. The affinity of one application to another, for instance, represents a functional and/or experiential relationship between the applications. In at least one implementation, an affinity between applications represents a predefined relationship, such as part of the system information 228 and/or the context data 214. For instance, a particular set of applications may be defined as having a high affinity for one another, such as based on the applications presenting complementary functionalities and/or user experiences. A different set of applications, however, may be defined as having a low affinity for one another. Applications with low affinity, for example, represent applications with non-complementary functionalities and/or user experiences.

Generally, a level of affinity between applications can be used to determine whether to present the applications on the client device 102 in a cooperative context or an alternative context. For instance, consider that the context data 214 indicates that the application 120a has a high affinity for an application 120b that has already been launched on the display device 104. Accordingly, the application 120a is launched on the display device 106 to enable the applications 120a, 120b to be presented on respective adjacent displays such that a user can view and interact with both of the applications 120a, 120b.

Consider, however, another scenario where the context data 214 indicates that the application 120a has a low affinity (e.g., no affinity) with the application 120b. In this instance, the application 120a can be launched on top of the application 120b such that a graphical user interface (GUI) for the application 120a partially or totally occludes a GUI for the application 120b on the display devices 104, 106. Thus, the launch behavior 304 can be determined based on a level of affinity between the application 120a and a different application.

User Attributes—different known attributes of a user can be used to configure the launch behavior 304, such as user attributes discussed above with reference to the user settings 234 and/or the calibration data 236. For instance, if a user that is interacting with the client device 102 is known to be left handed, and the application 120a is configured for user input (e.g., an input primary application), the launch behavior 304 can indicate that the application 120a is to launched on a left display device, e.g., the display device 104.

Functional Configuration of Display Device—the launch behavior 304 can be configured based on a functionality utilized by the application 120a, and functionality available on the respective display devices 104, 106. A functionality, for example, represents a hardware capability, a software capability, and/or a service, such as a service provided by the operating system 116. For instance, in at least one implementation, the display devices 104, 106 are functionally asymmetric such that the display device 104 includes functionality that the display device 106 does not, and/or vice-versa. Thus, if the display device 104 includes functionality that is utilized by the application 120a but the display device 106 does not include the functionality, the launch behavior 304 can indicate that the application 120a is to launch on the display device 104.

As one example, consider that the application 120a utilizes near field communication (NFC), such as for implementing mobile payments. Further to this example, the display device 106 has NFC capability but the display device 104 does not. Accordingly, the launch behavior 304 can specify that the application 120a is to launch on the display device 106 and not the display device 104.

As another example, consider that the application 120a utilizes voice calling, such as a voice over Internet protocol (VoIP) application. Further, the display device 104 includes audio input hardware (e.g., a microphone), but the display device 106 does not. Accordingly, the launch behavior 304 can specify that the application 120a is to launch on the display device 104 and not the display device 106.

These scenarios are presented for purpose of example only, and it is to be appreciated that a variety of different functional differences between the display devices 104, 106 can be considered in configuring the launch behavior 304.

Device Orientation—a posture of the client device 102 can be considered in configuring the launch behavior 304. As discussed above, posture can include various device attributes, such as orientation of the display device 104 and/or the display device 106 relative to a gravitational vector, angle of the display devices 104, 106 relative to each other, a position in which a user is gripping the client device 102, and so forth. Different device postures, for instance, can be associated with different application launch behaviors.

These are just a few examples of ways in which the launch behavior 304 can be determined, and other ways and variations of determining the launch behavior 304 are discussed throughout this disclosure.

In the lower portion of the scenario 300, the launch behavior 304 is applied to launch the application 120a on the display device 104. Generally, "launching" an application herein refers to presenting a visual representation (e.g., a GUI) of an application when the application is executed. For instance, in the context of the scenario 300, the application 120a may be executed by a processor located on either/both of the display devices 104, 106. However, in this particular example, a GUI for the application 120a is presented on the display device 104 and according to the launch behavior 304.

Figure 4:
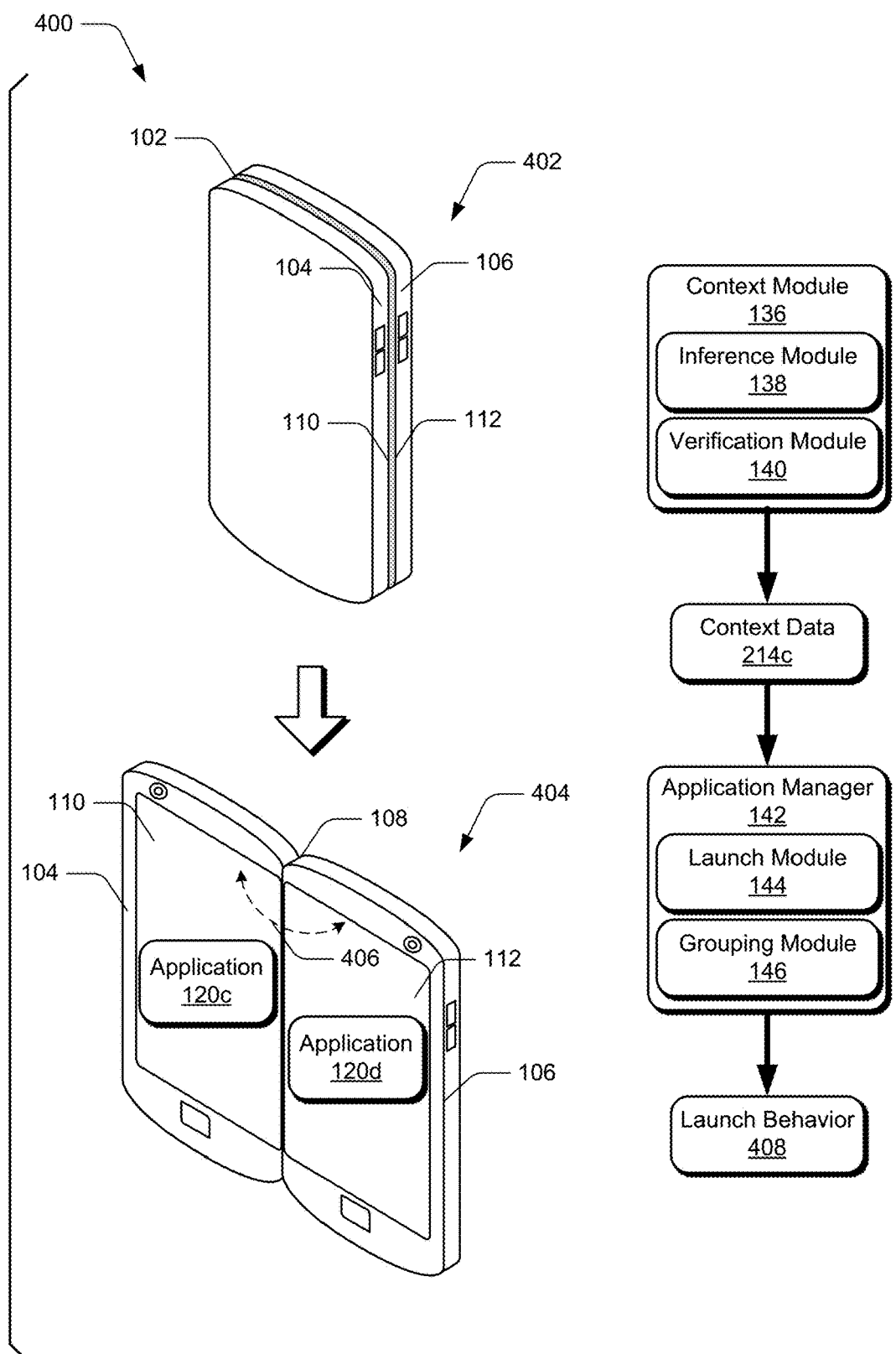
FIG. 4 depicts example implementation scenarios for determining a launch behavior based on a change in device posture in accordance with one or more implementations.

FIG. 4 depicts an example implementation scenario 400 for determining a launch behavior based on a change in device posture in accordance with one or more implementations. In the upper portion of the scenario 400, the client device 102 is positioned with the display devices 104, 106 at a posture 402. The posture 402, for instance, represents a closed posture for the client device 102 where the touch surfaces 110, 112 are positioned facing each other. A user may place the client device 102 in the posture 402 in various scenarios, such as at night when the user is asleep, when the user places the client device 102 in a pocket or a carry bag, when the user is in a meeting, and so forth. In at least one implementation, when the client device 102 is placed in the posture 402, the client device 102 automatically transitions to a low power (e.g., sleep) state where certain functionalities of the client device 102 are operated in a low power mode or powered off, such as the display devices 104, 106.

Proceeding to the lower portion of the scenario 400, a user opens the client device 102 from the posture 402 to a posture 404. In this example, the posture 404 represents a posture where the display devices 104, 106 are positioned side by side such that the touch surfaces 110, 112 together form an approximately planar surface. A hinge angle 406 of the hinge 108, for instance, is approximately 180 degrees, +/−10 degrees. In at least one implementation, the change from the posture 402 to the posture 404 causes the client device 102 to transition from a sleep mode to an active mode.

The context module 136 detects the change from the posture 402 to the posture 404, and based on the change generates context data 214c. The context data 214c, for instance, represents an instance of the context data 214. Thus, the context data 214c can be generated using various information, such as the input signal 206, the sensor information 216, and the system information 228. The context data 214c, for instance, indicates the change from the posture 402 to the posture 404. The context module 136 communicates the context data 214c to the application manager 142, and the launch module 144 uses the context data 214c to generate a launch behavior 408. The launch behavior 408 generally includes data that is usable to launch one or more applications 120. Examples of different launch behaviors are discussed above.

In this particular scenario, the launch behavior 408 causes an application 120c to launch on the display device 104, and an application 120d to launch on the display device 106. Generally, the launch behavior 408 can be affected by various types of the context data 214b. For instance, in addition to the change from the posture 402 to the posture 404, the context data 214b can indicate a current time of day, e.g., early morning. Thus, the launch module 144 can determine that when a user opens the client device 102 in a time range that includes the current time of day, the user typically launches the applications 120c, 120d. The application 120c, for example, is a news application and the application 120d is an email application. Thus, based on the context data 214b, the launch module 144 automatically launches the application 120c on the display device 104 and the application 120d on the display device 106 without requiring explicit user input to launch the applications.

Figure 5:
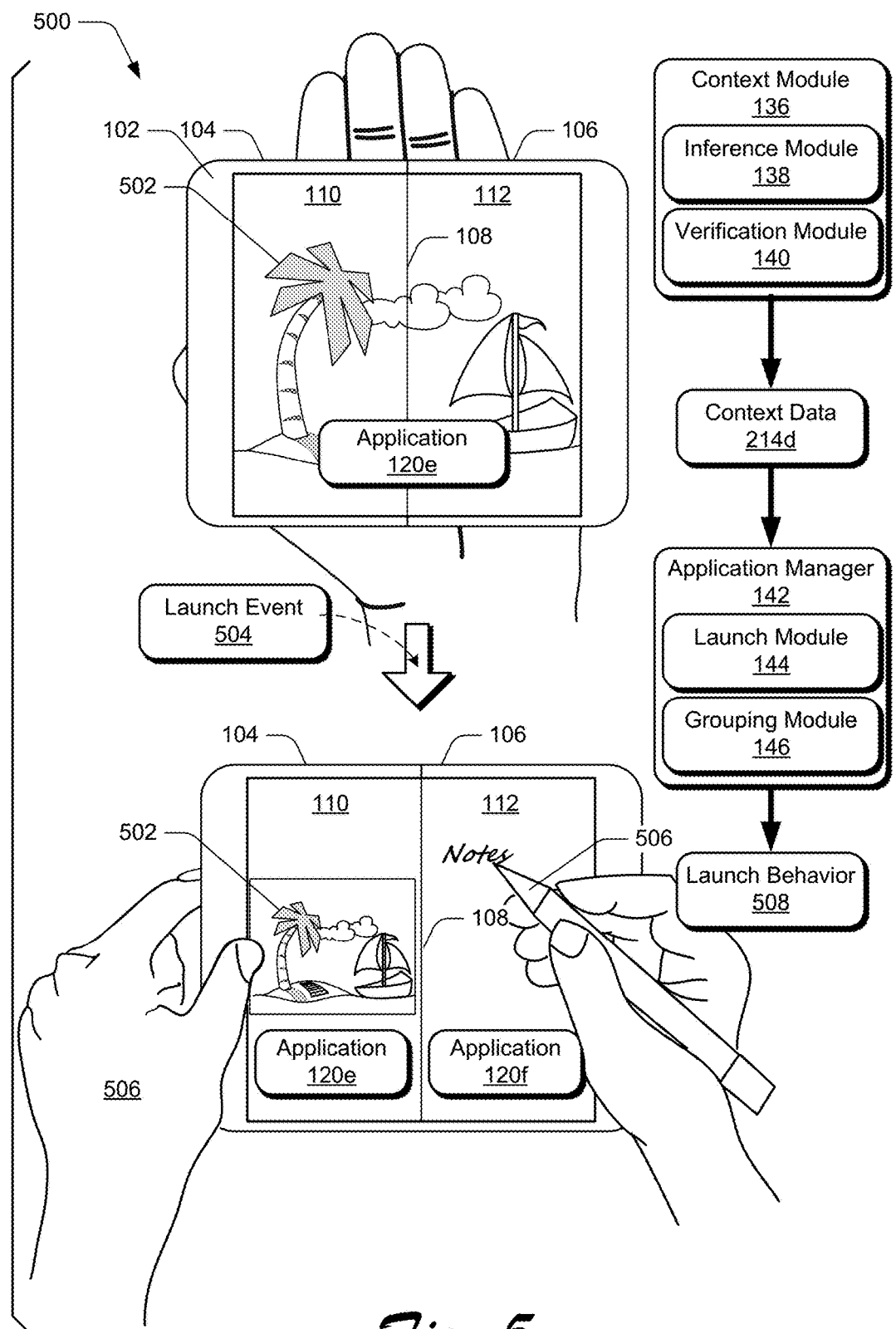
FIG. 5 depicts an example implementation scenario for application launching based on context in accordance with one or more implementations.

FIG. 5 depicts an example implementation scenario 500 for application launching based on context in accordance with one or more implementations. The upper portion of the scenario 500 depicts the display devices 104, 106 displaying content 502 for an application 120e via both of the display devices 104, 106. The application 120e, for instance, is executing on the client device 102 and is presenting the content 502 for display. The content 502 can represent various types of visual content, such as web content, a still image, video, animation, and so forth.

Proceeding to the lower portion of the scenario, a launch event 504 occurs that causes an application 120f to be launched on the client device 102. Generally, the launch event 504 can occur in various ways. The user, for instance, provides input to cause the application 120f to be launched, such as selecting a visual representation of the application 120f (e.g., an application icon), providing a voice input instruction to launch the application 120f, providing a custom touch gesture associated with launching the application 120f, and so forth.

As another example of the launch event 504, the user brings a pen 506 in proximity to and/or in contact with the touch surface 112, and the launch module 144 interprets this as a request to launch the application 120f. The application 120f, for example, represents an application that accepts digital ink input, such as a notetaking application.

As part of launching the application 120f, the launch module 144 determines context data 214d for the launch event 504. The context data 214d, for instance, represents an instance of the context data 214 and can be generated in various ways such as described with reference to the scenario 200. In this particular example, the context data 214d indicates that the application 120f has a high affinity for the application 120e. The application 120f, for instance, represents a pre-designated companion experience for the application 120e. Thus, the launch module 144 determines, based on the context data 214d, a launch behavior 508 that specifies how the application 120f is to be launched. Since the context data 214d indicates that the application 120f has a high affinity for the application 120e, the launch behavior 508 indicates that the application 120f is to be launched and presented concurrently with the application 120e. As depicted, for instance, launching the application 120f causes the application 120e to be moved to the display device 104, and the application 120f to be launched on the display device 106. The applications 120e, 120f, for instance, are concurrently visible as a side-by-side experience that enables a user to view the application 120e and provide input to the application 120f without having to switch between the applications.

Figure 6:
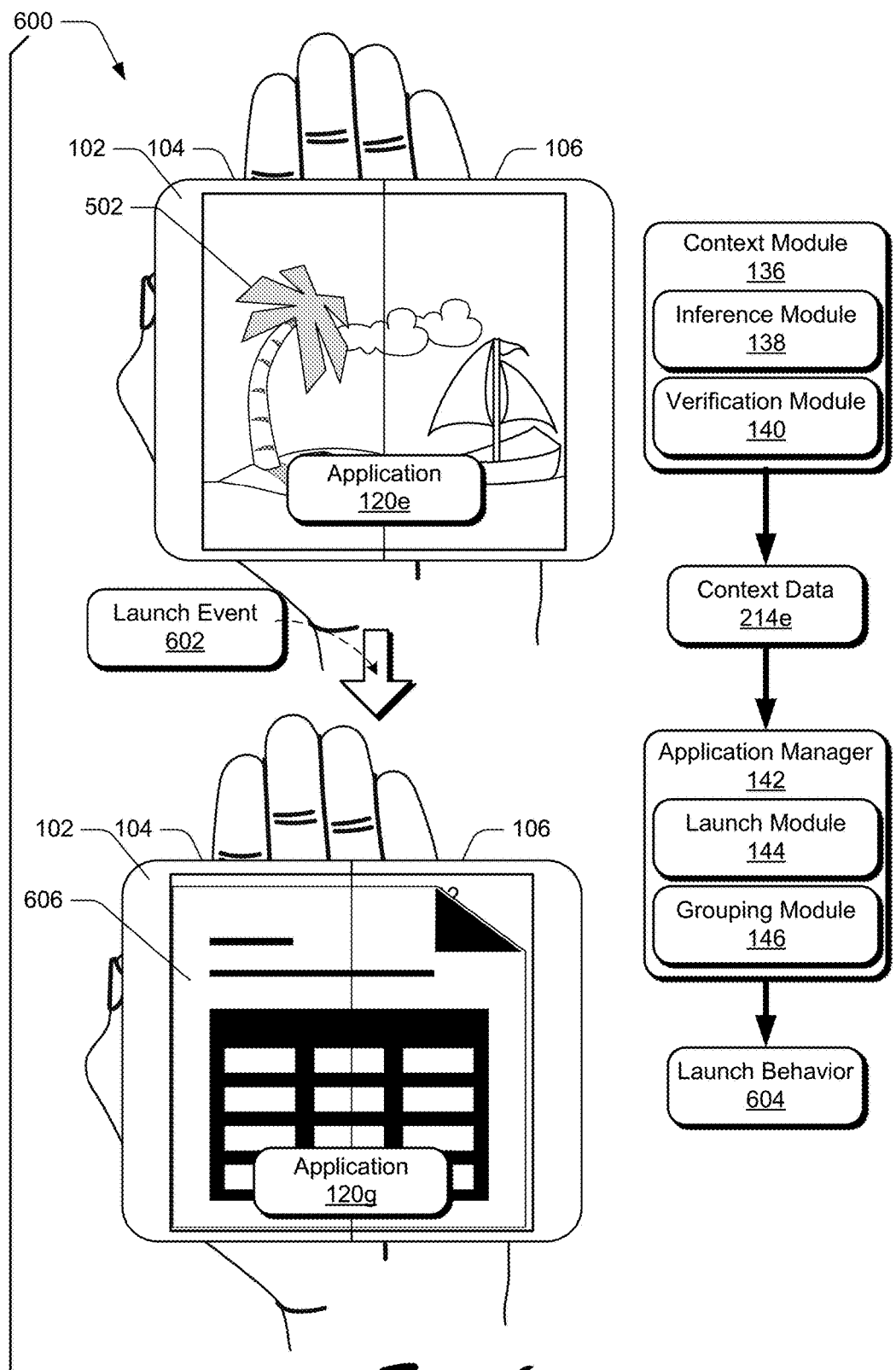
FIG. 6 depicts an example implementation scenario application launching based on context in accordance with one or more implementations.

FIG. 6 depicts an example implementation scenario 600 for application launching based on context in accordance with one or more implementations. The scenario 600, for instance, represents a variation on the scenario 500 described above.

The upper portion of the scenario 600 depicts the display devices 104, 106 displaying the content 502 for the application 120e via both of the display devices 104, 106. The application 120e, for instance, is executing on the client device 102 and is presenting the content 502 for display.

Proceeding to the lower portion of the scenario 600, a launch event 602 occurs that causes an application 120g to be launched on the client device 102. Generally, the launch event 602 can occur in various ways, examples of which are discussed above.

As part of launching the application 120g, the launch module 144 determines context data 214e for the launch event 504. The context data 214e, for instance, represents an instance of the context data 214 and can be generated in various ways such as described above. In this particular example, the context data 214e indicates that the application 120g has a low affinity (e.g., no affinity) for the application 120e. The application 120g, for instance, is designated as having a low affinity for the application 120e, or has no defined affinity value for the application 120e. Thus, the launch module 144 determines, based on the context data 214e, a launch behavior 604 that specifies how the application 120g is to be launched. Since the context data 214d indicates that the application 120g has a low affinity or no affinity for the application 120e, the launch behavior 604 indicates that the application 120g is to be launched and presented to visually occlude the application 120e.

As depicted, for instance, launching the application 120g causes content 606 for the application 120g to be presented on both of the display devices 104, 106 such that the content 502 of the application 120e is no longer visible. While the application 120e may still be running on the client device 102, the content 606 is presented in a higher z order than the application 120e, e.g., as visually occluding the content 502. A user may provide input to cause the application 120e to be returned to focus on the display devices 104, 106, such as via input that causes the content 502 to be presented in a higher z order than the content 606, e.g., as visually occluding the content 502.

Accordingly, functional and/or experiential affinity between applications can be considered in determining how to launch and/or present the applications.

Figure 7:
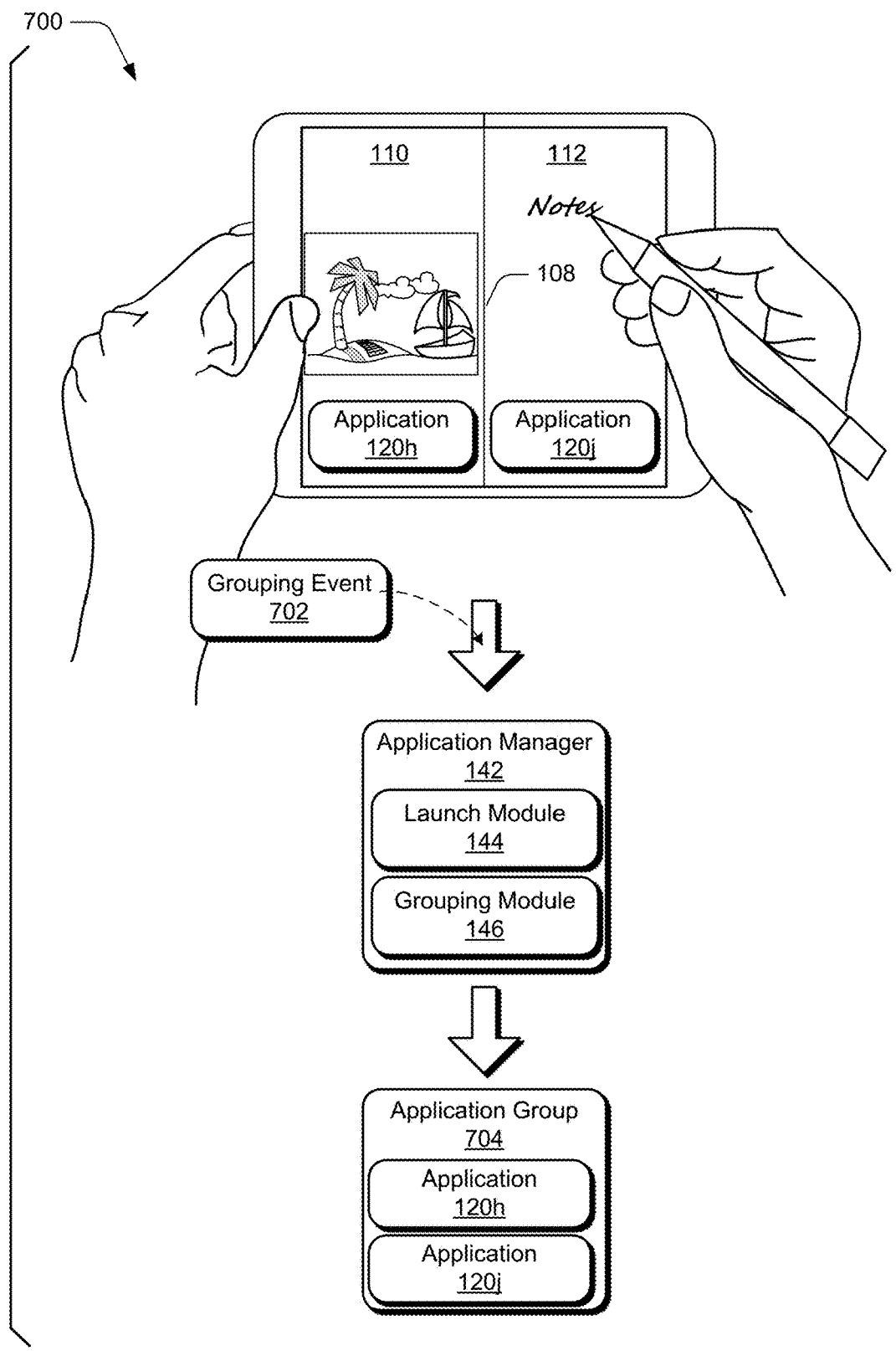
FIG. 7 depicts an example implementation scenario for application grouping based on context in accordance with one or more implementations.

FIG. 7 depicts an example implementation scenario 700 for application grouping based on context in accordance with one or more implementations. In the upper portion of the scenario 700, the client device 102 is executing an application 120h on the display device 104, and an application 120j on the display device 106. In at least one implementation, the applications 120h, 120j are launched on their respective displays based on a particular launch behavior, examples of which are described above.

Further to the scenario 700, a grouping event 702 occurs that causes the applications 120h, 120j to be grouped as an application group 704. The grouping module 146, for instance, detects the grouping event 702 and causes the applications 120h, 120j to be grouped as the application group 704. In at least one implementation, the application group 704 represents a new application group that is generated in response to the grouping event 702. Alternatively, the application group 704 represents a pre-existing application group to which the applications 120h, 120j are added.

The application group 704 generally represents a group of applications that are functionally interrelated such that certain actions can be applied to the applications as a group. For instance, the application group 704 can be invoked to cause applications included in the group to be launched together as a group, such as in response to a single launch event. Further, the application group 704 can be closed to cause applications in the group to be closed together, such as in response to a single closing event.

Generally, the grouping event 702 can occur in response to an explicit and/or implicit action. For instance, a user can provide input to cause the grouping event 702. Examples of grouping-related user input include user selection of a grouping control displayed on the client device 102, a user gesture that invokes grouping functionality, a voice command that invokes grouping functionality, and so forth.

An implicit action may also cause the grouping event 702. For instance, consider that a user frequently launches the applications 120*h*, 120*j* together but via separate launch inputs. The user, for instance, separately selects the applications 120*h*, 120*j* such that the applications 120*h*, 120*j* are separately launched and are concurrently active on the client device 102. Further, the user does this frequently, such as daily over a particular period of time. In at least one implementation, the context module 136 detects this co-launching activity as context data, and reports the context data to the launch module 144. Accordingly, the grouping module 146 can infer from the context data that the applications 120*h*, 120*j* are to be grouped, and thus the grouping module 146 generates the application group 704.

As yet another example, data from other users can indicate that the application 120*j* is often launched with the application 120*h*. Such data may be gathered via "crowd-sourcing," such as via a distributed platform that monitors application-related activity of multiple users and identifies trends in the activity. One such trend may be that different users often launch the applications 120*h*, 120*j* together, and/or that different users provide feedback indicating that the applications 120*h*, 120*j* are recommended to be executed as a group.

Accordingly, the application group 704 is invocable as a group such that a single input can be used to launch applications included in the application group 704, e.g., the applications 120*h*, 120*j*. Further, certain actions can be applied to applications of the application group 704 "as a group," e.g., to all of the applications within the application group 704. For instance, when a single action is indicated for the application group 704, the action can be applied to all of the applications within the application group 704.

In at least some implementations, a particular application can be included in multiple groups. Thus, determining which application group to launch when the application is launched can be performed based on explicit and/or implicit launch context. Consider, for instance, the following scenario.

Figure 8:
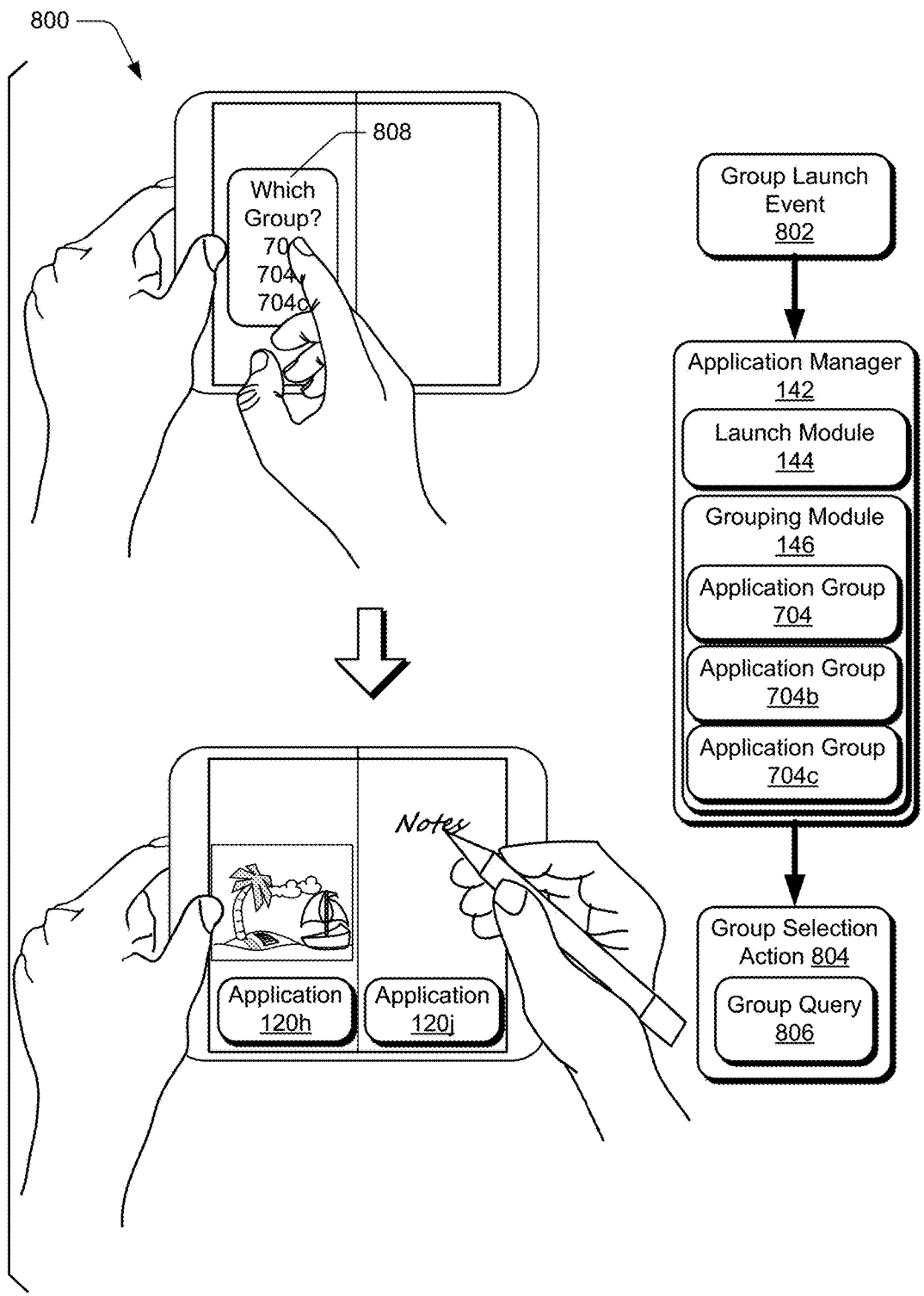
FIG. 8 depicts an example implementation scenario for launching an application group in accordance with one or more implementations.

FIG. 8 depicts an example implementation scenario 800 for launching an application group in accordance with one or more implementations. In the scenario 800, an application group launch event 802 occurs indicating that an application group is to be launched. The group launch event 802 occurs, for instance, in response to an explicit and/or implicit launch-related action indicating that an application group is to be launched. In this particular example, the group launch event 802 is based on an action to launch the application 120*h*, such as user input requesting launch of the application 120*h*.

Continuing with the scenario 800, the grouping module 146 determines that the application 120*h* is included in multiple different application groups, and thus performs a group selection action 804 to determine which application group to launch. The application 120*h*, for instance, is included in the application group 704, as well as an application group 704*b* and an application group 704*c*. Generally, the application groups 704, 704*b*, 704*c* each include a different respective group of applications that each include the application 120*h*. Further to the scenario 800, the grouping module 146 determines based on the group selection action 804 that the application group 704 is to be launched. Accordingly, the launch module 144 launches the application group 704 on the client device 102, e.g., the applications 120*h*, 120*j*.

Generally, the group selection action 804 can occur in various ways. In one example, the grouping module 146 initiates a group query 806 that queries a user to identify which application group to launch. The group query 806, for example, notifies the user that multiple application groups are available to launch, and queries the user to select which application group to launch. In this particular example, the grouping module 146 presents group selection control 808 that identifies the different application groups 704, 704*a*, 704*b*, and that is configured to receive user input to select one of the application groups. Thus, the user selects the application group 704 from the group selection control 808 to cause the application group 704 to be launched.

As another example, context data 214 identified by the context module 136 can be used by the grouping module 146 to determine which application group to launch. Examples of different context data 214 are discussed above, and include a device gesture 210, an implicit gesture 212, sensor information 216, and/or system information 228. For instance, consider that when the group launch event 802 occurs, the client device 102 is positioned in a particular posture, such as with respect to a relative angle of the display devices 104, 106. Further, the particular posture is identified as being associated with the application group 704. A user preference, for instance, identifies that the application group 704 is preferred when the client device 102 is in the particular posture.

As another example, sensor information 216 can indicate that based on a particular set of detected environmental conditions, the application group 704 is preferred. As yet another example, the application group 704 can be functionally associated with an application that is already executing on the client device 102, and thus the application 120*a* is selected. Generally, any type and/or combination of context data 214 can be leveraged to determine which application group to launch in a particular group launch scenario.

Accordingly, the aforementioned scenarios illustrates that techniques for application launching in a multi-display device described herein enable application launching and grouping based on various types of context information. The context data described herein, including the particular postures and posture changes, is presented for purpose of example only, and it is to be appreciated that a wide variety of different types of context data can be used to generate and affect application launch and grouping behaviors according to techniques for application launching in a multi-display device described herein.

Having described some example implementation scenarios, consider now some example procedures for application launching in a multi-display device in accordance with one or more implementations.

Example Procedures

The following discussion describes example procedures for application launching in a multi-display device in accordance with one or more implementations. The example procedures may be employed in the environment 100 of FIG. 1, the system 1300 of FIG. 13, and/or any other suitable environment. The procedures, for instance, represent procedures for implementing the example implementation scenarios discussed above. In at least some implementations, the steps described for the various procedures can be implemented automatically and independent of user interaction, such as by the context module 136, the application manager 142, and/or interaction between these modules. Further, the steps described in the procedures below can be performed in any suitable combination and/or order, and are not intended to be construed as limited to the orders described.

Figure 9:
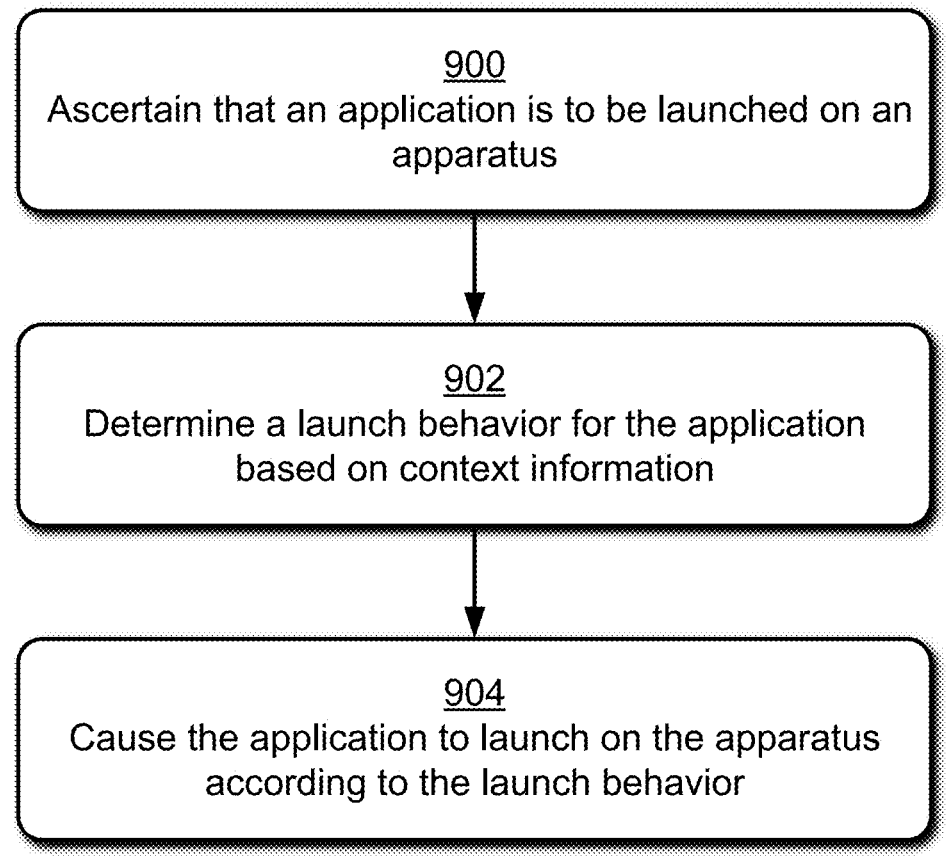
FIG. 9 is a flow diagram that describes steps in a method for launching an application based on context in accordance with one or more implementations.

FIG. 9 is a flow diagram that describes steps in a method in accordance with one or more implementations. The method, for instance, describes an example procedure for launching an application based on context information.

Step 900 ascertains that an application is to be launched on an apparatus. The application manager 142, for instance, detects a launch event indicating that an application is to be launched on the client device 102. Examples of different launch events are discussed above, and can include explicit and implicit actions by a user that causes an application to be launched.

Step 902 determines a launch behavior for the application based on context information. Different types and instances of context information that can be considered for launching an application are discussed above. Examples of the context information include a device-based gesture of the apparatus (e.g., a device gesture 210 and/or an implicit gesture 212), sensor information 216 gathered via the client device 102, system information 228 (e.g., a functional configuration of the display device 104 and/or the display device 106, application state for the application), and so forth.

In at least one implementation, the context information includes an indication of an affinity between an application that is currently active on the apparatus, and the application to be launched. As indicated above, an indication of affinity between applications can be based on application types for the applications, and/or based on a pre-configured indication of affinity between applications. For instance, when the application is indicated as having a high affinity for another application that is active on the client device 102, the application can be launched to provide a complementary experience for the applications. The application can be launched, for example, such that GUIs for the applications are both concurrently visible and available for user interaction.

In a different example where the application has a low affinity for another application that is active on the client device 102, the application can be launched to present an alternative user experience to the other application. A GUI for the application, for instance, can partially or wholly occlude a GUI for the other application on the display devices 104, 106.

As another example, context information includes configuration information for the different display devices, such as relative hardware configurations of the display device 104 and the display device 106. For instance, consider that the application utilizes a particular hardware functionality. Further, the display device 104 includes the particular hardware functionality, but the display device 106 does not. Accordingly, the launch behavior can indicate that the application is to launch on the display device 104 to enable the application to have access to the particular hardware functionality.

Step 904 causes the application to launch on the apparatus according to the launch behavior. The launch module 144, for instance, applies the launch behavior to cause the application to be launched (e.g., executed and displayed) on the client device 102. Examples of launching the application according to the launch behavior include launching the application on a particular display device 104, 106, launching the application on both of the display devices 104, 106, rearranging a different application that is already executing on the client device 102 to accommodate the application launch, and so forth.

Figure 10:
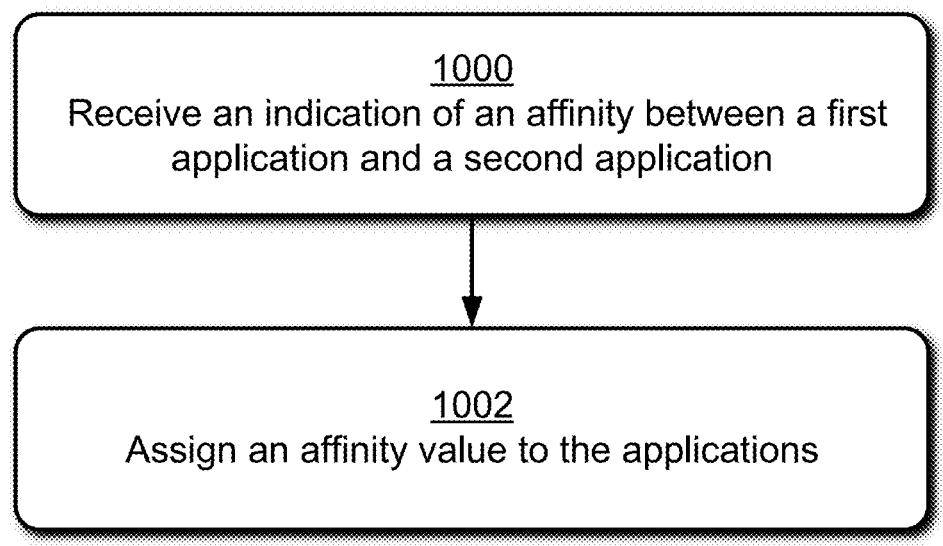
FIG. 10 is a flow diagram that describes steps in a method for defining affinity between applications in accordance with one or more implementations.

FIG. 10 is a flow diagram that describes steps in a method in accordance with one or more implementations. The method, for instance, describes an example procedure for defining affinity between applications.

Step 1000 receives an indication of an affinity between a first application and a second application. In at least one implementation, user input is received identifying an affinity between the applications. A user, for instance, provides input indicating that the applications have a high affinity, a medium affinity, or a low affinity.

Alternatively or additionally, affinity between applications can be based on application type. For instance, two productivity-related applications (e.g., a word processor and a spreadsheet application) may be indicated as high affinity applications based on a common application type. However, a productivity-related application and an entertainment application (e.g., a video player) may be indicated as having a low affinity since the applications are of differing application types.

Step 1002 assigns an affinity value to the applications. In at least one implementation, affinity can be assigned using a value-based scale. For instance, applications with high affinity can be given an affinity value of 1, applications with a medium affinity can be given an affinity value of 0.5, and applications with low (and/or no) affinity can be given an affinity value of 0. Affinity values between these particular values can also be assigned to indicate different levels of affinity. As described throughout, affinity between applications can be used for various purposes, such as for determining application launch behavior and/or application grouping behavior.

Figure 11:
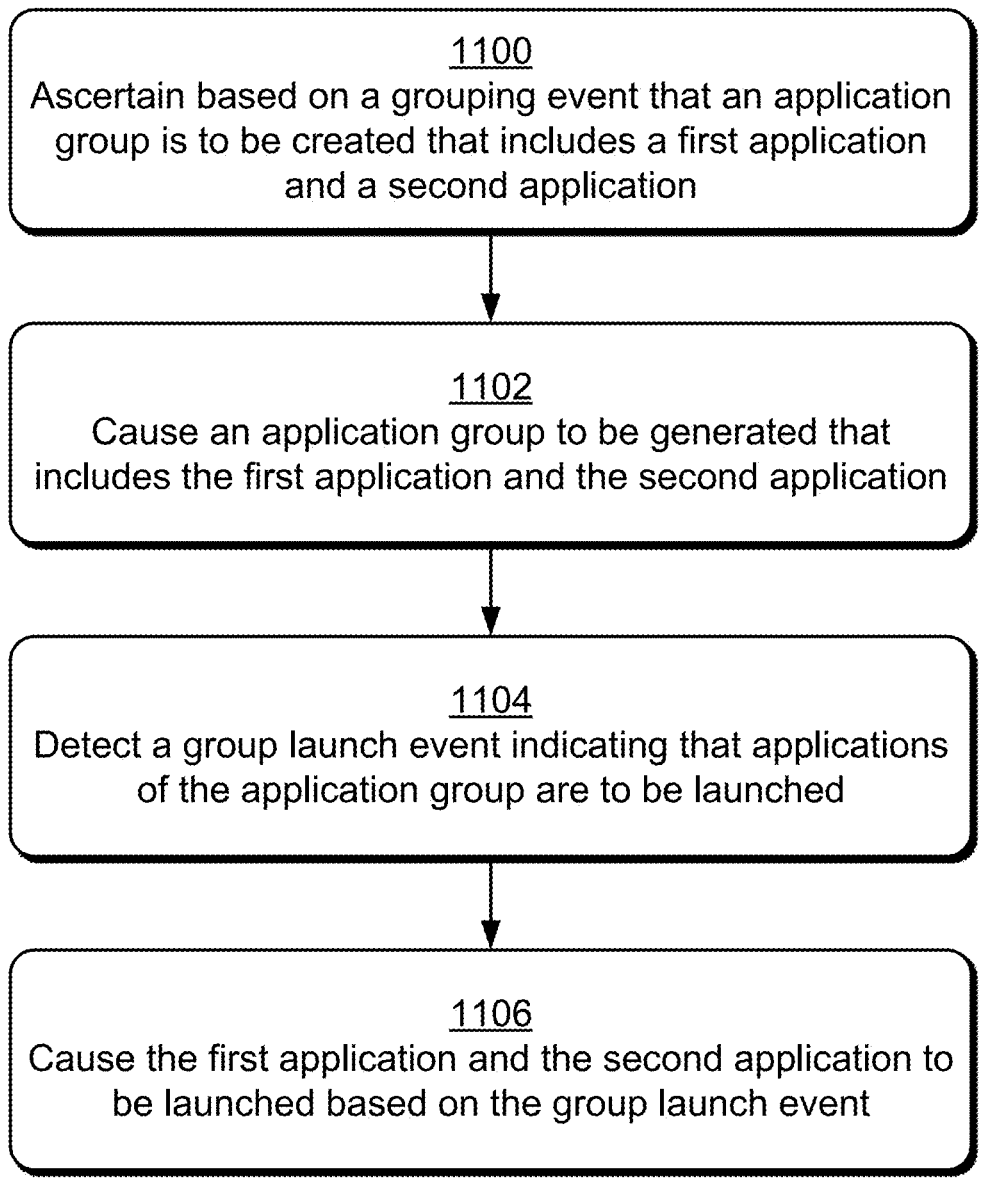
FIG. 11 is a flow diagram that describes steps in a method for application grouping in accordance with one or more implementations.

FIG. 11 is a flow diagram that describes steps in a method in accordance with one or more implementations. The method, for instance, describes an example procedure for application grouping. In at least one implementation, portions of the procedure can be performed by the application manager 142, such as by the grouping module 146.

Step 1100 ascertains based on a grouping event that an application group is to be created that includes a first application and a second application. Different types of grouping events are described above, and include user input to group applications, contextual information used to group applications, crowdsourced data used to identify a potential application group, and so forth.

In at least one implementation, the grouping event is based on an indication of an affinity between the first application and the second application. For instance, when the applications are indicated as having a high affinity value, the applications can be identified to a user as being candidates for grouping. Accordingly, the user can provide input to cause the applications to be grouped, such as by providing input approving an automatically-generated suggestion to group the applications. As discussed above, affinity between applications can be identified in various ways, such as based on a user launch pattern associated with the applications, application type for the applications, crowdsourced data that relates to the applications, and so forth.

Step 1102 causes an application group to be generated that includes the first application and the second application. The application group, for instance, represents a data structure that interrelates the first application and the second application. Generally, the application group is invocable to cause the first and second applications to be launched together.

Step 1104 detects a group launch event indicating that applications of the application group are to be launched. A user, for instance, selects a visual representation of the application group, e.g., an icon. As another example, a contextual event can initiate the group launch event, such as a device gesture 210, an implicit gesture 212, sensor information 216 that initiates the group launch event, a change in system information 228 that generates the group launch event, and so forth.

Step 1106 causes the first application and the second application to be launched based on the group launch event. The launch module 144, for example, detects the group launch event and causes the first application and the second application to be launched together. In the context of a multi-screen device such as the implementation of the client device 102 described above, the first application and the second application can be launched on different respective display devices 104, 106. Further, consider a scenario where the first application is an output primary application and the second application is an input primary application. Thus, the first application can be launched on an output primary display device, and the second application can be launched on an input primary display device.

As mentioned previously, a group launch event can include a launch of an application that is included in multiple different groups. Accordingly, a group selection can be utilized to determine which application group to launch.

Figure 12:
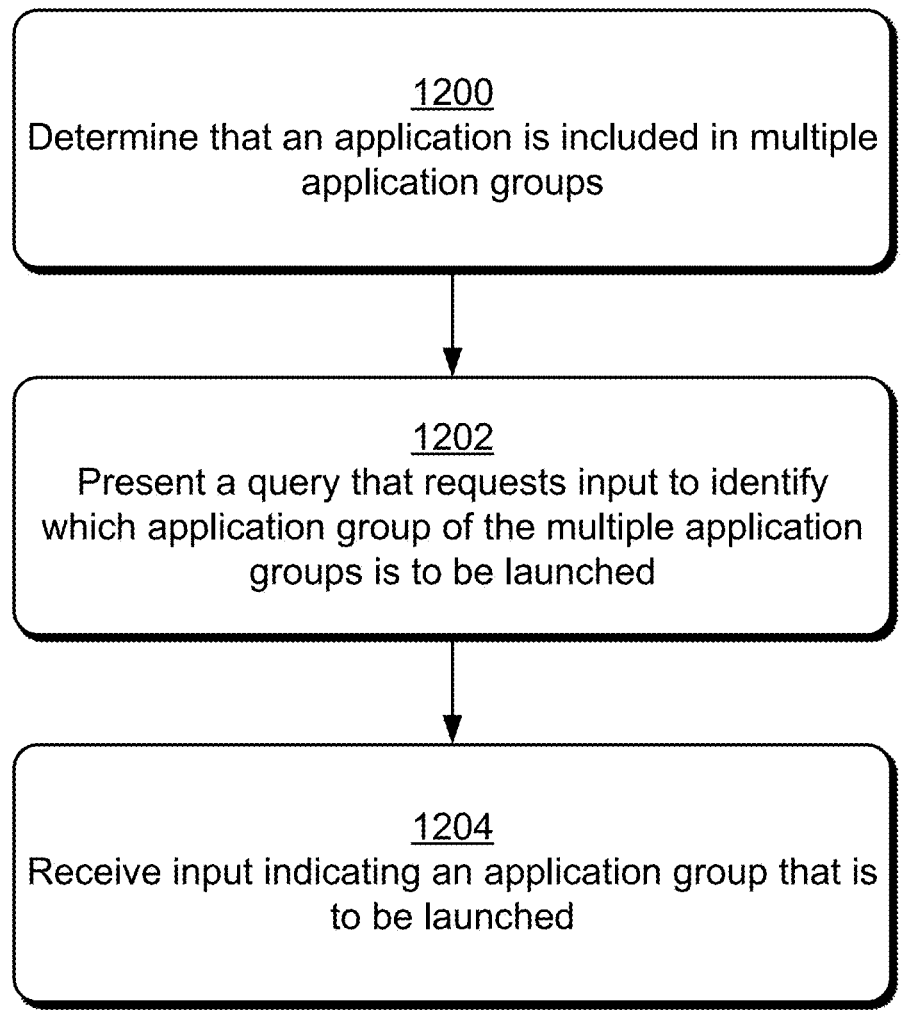
FIG. 12 is a flow diagram that describes steps in a method for selecting an application group to be launched in accordance with one or more implementations.

FIG. 12 is a flow diagram that describes steps in a method in accordance with one or more implementations. The method, for instance, describes an example procedure for selecting an application group to be launched. In at least one implementation, portions of the procedure can be performed by the application manager 142, such as by the grouping module 146.

Step 1200 determines that an application is included in multiple application groups. The application, for instance, represents an application that is to be launched in response to a group launch event.

Step 1202 presents a query that requests input to identify which application group of the multiple application groups is to be launched. The application manager 142, for instance, presents a query that identifies multiple available application groups that are available to be launched. The query, for example, indicates that the application is included in multiple different groups, and includes selectable indicia that are selectable to enable each of the application groups to be launched.

Step 1204 receives input indicating an application group that is to be launched. The launch module 144, for instance, receives a user selection of an application group from the multiple different application groups. Accordingly, applications from the application group are launched together.

Accordingly, techniques described herein provide more efficient control of display devices of a hinged device and improve the user experience by optimizing output and input characteristics of the display devices based on different usage scenarios. Further, by reducing power utilized by input devices, output devices, and sensors that are designated as secondary (e.g., not primary), implementations reduce power consumption, thus conserving power and battery life of a client device.

Having described some example implementation details, consider now a discussion of an example system and device in accordance with one or more implementations.

Example System and Device

Figure 13:
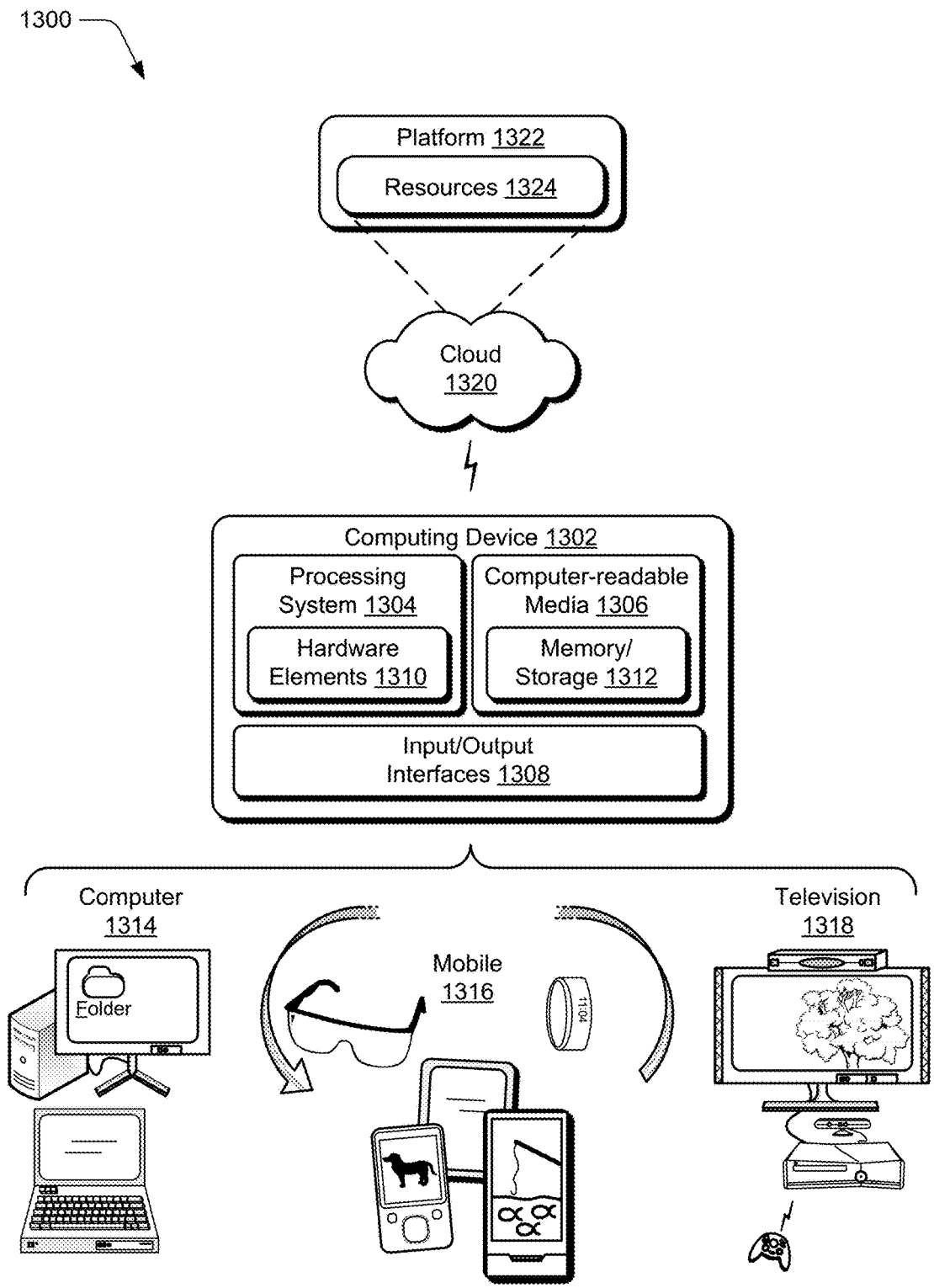
FIG. 13 illustrates an example system including various components of an example device that can be implemented as any type of computing device as described with reference to FIGS. 1-12 to implement techniques described herein.

FIG. 13 illustrates an example system generally at 1300 that includes an example computing device 1302 that is representative of one or more computing systems and/or devices that may implement various techniques described herein. For example, the client device 102 discussed above with reference to FIG. 1 can be embodied as the computing device 1302. The computing device 1302 may be, for example, a server of a service provider, a device associated with the client (e.g., a client device), an on-chip system, and/or any other suitable computing device or computing system.

The example computing device 1302 as illustrated includes a processing system 1304, one or more computer-readable media 1306, and one or more Input/Output (I/O) Interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1306 is illustrated as including memory/storage 1312. The memory/storage 1312 represents memory/storage capacity associated with one or more computer-readable media. The memory/storage 1312 may include volatile media (such as random access memory (RAM)) and/or nonvolatile media (such as read only memory (ROM), Flash memory, optical disks, magnetic disks, and so forth). The memory/storage 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), motion functionality (e.g., accelerometers or other sensors that are configured to detect physical motion), a camera (e.g., which may employ visible or non-visible wavelengths such as infrared frequencies to detect movement that does not involve touch as gestures), six degrees of freedom controllers such as used in virtual reality and augmented reality technologies, and so forth. Examples of output devices include a display device (e.g., a monitor or projector), speakers, a printer, a network card, tactile-response device, head mounted displays (e.g., for virtual reality and augmented reality applications), and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1310 and computer-readable media 1306 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of modules that are executable by the computing device 1302 as software may be achieved at least partially in hardware, e.g., through use of computer-readable storage media and/or hardware elements 1310 of the processing system. The instructions and/or functions may be executable/operable by one or more articles of manufacture (for example, one or more computing devices 1302 and/or processing systems 1304) to implement techniques, modules, and examples described herein.

As further illustrated in FIG. 13, the example system 1300 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1300, multiple devices are interconnected through a central computing device. The central computing device may be local to the multiple devices or may be located remotely from the multiple devices. In one implementation, the central computing device may be a cloud of one or more server computers that are connected to the multiple devices through a network, the Internet, or other data communication link.

In one implementation, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one implementation, a class of target devices is created and experiences are tailored to the generic class of devices. A class of devices may be defined by physical features, types of usage, or other common characteristics of the devices.

In various implementations, the computing device 1302 may assume a variety of different configurations, such as for computer 1314, mobile 1316, and television 1318 uses. Each of these configurations includes devices that may have generally different constructs and capabilities, and thus the computing device 1302 may be configured according to one or more of the different device classes. For instance, the computing device 1302 may be implemented as the computer 1314 class of a device that includes a personal computer, desktop computer, a multi-screen computer, laptop computer, netbook, and so on.

The computing device 1302 may also be implemented as the mobile 1316 class of device that includes mobile devices, such as a mobile phone, portable music player, portable gaming device, a tablet computer, a wearable device (e.g., a watch, glasses, an article of clothing, etc.), a multi-screen computer, and so on. The computing device 1302 may also be implemented as the television 1318 class of device that includes devices having or connected to generally larger screens in casual viewing environments. These devices include televisions, set-top boxes, gaming consoles, and so on.

The techniques described herein may be supported by these various configurations of the computing device 1302 and are not limited to the specific examples of the techniques described herein. For example, functionalities discussed with reference to the client device 102 may be implemented all or in part through use of a distributed system, such as over a "cloud" 1320 via a platform 1322 as described below.

The cloud 1320 includes and/or is representative of a platform 1322 for resources 1324. The platform 1322 abstracts underlying functionality of hardware (e.g., servers) and software resources of the cloud 1320. The resources 1324 may include applications and/or data that can be utilized while computer processing is executed on servers that are remote from the computing device 1302. Resources 1324 can also include services provided over the Internet and/or through a subscriber network, such as a cellular or Wi-Fi network.

The platform 1322 may abstract resources and functions to connect the computing device 1302 with other computing devices. The platform 1322 may also serve to abstract scaling of resources to provide a corresponding level of scale to encountered demand for the resources 1324 that are implemented via the platform 1322. Accordingly, in an interconnected device implementation, implementation of functionality described herein may be distributed throughout the system 1300. For example, the functionality may be implemented in part on the computing device 1302 as well as via the platform 1322 that abstracts the functionality of the cloud 1320.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different implementations are described. It is to be appreciated and understood that each implementation described herein can be used on its own or in connection with one or more other implementations described herein. Further aspects of the techniques discussed herein relate to one or more of the following implementations.

A system for causing an application launch based on a determined launch behavior, the system including: an apparatus having a first display device and a second display device physically connected to each other and hingeably moveable relative to each other about a hinge; at least one processor; and at least one computer-readable storage media storing instructions that are executable by the at least one processor to perform operations including: ascertaining that an application is to be launched on the apparatus; determining a launch behavior for the application based context information that includes one or more of a device-based gesture of the apparatus, functional configuration of one or more of the first display device or the second display device, or application state for the application; and causing the application to launch on the apparatus according to the launch behavior.

In addition to any of the above described systems, any one or combination of: wherein the device-based gesture includes a change in relative angle between the first display device and the second display device; wherein the device-based gesture includes an opening gesture of the first display device relative to the second display device; wherein the device-based gesture includes an opening gesture of the first display device relative to the second display device, and wherein the launch behavior indicates that the application is to be launched on the first display device, and a second application is to be launched on the second display device; wherein the functional configuration indicates that the first display device includes different hardware functionality that the second display device, and wherein the launch behavior indicates that the application is to be launched on the first display device based on the different hardware functionality of the first display device; wherein the application is configured to utilize a particular hardware functionality, the functional configuration indicates that the first display device includes the different hardware functionality and the second display device does not include the hardware functionality, and wherein the launch behavior indicates that the application is to be launched on the first display device; wherein the functional configuration indicates that the first display device is designated as output primary, the application state indicates that the application is an output primary application, and the launch behavior indicates that the application is to launch on the first display device; wherein the functional configuration indicates that the first display device is designated as input primary, the application state indicates that the application is an input primary application, and the launch behavior indicates that the application is to launch on the first display device; wherein the application state indicates that the application has a high affinity for a different application that is executing on the apparatus, and wherein the launch behavior indicates that the application is to be launched on the first display device and the different application is to be executed on the second display device.

A computer-implemented method for causing an application launch based on a determined launch behavior, the method including: ascertaining that a first application is to be launched on an apparatus; determining a launch behavior for the first application based on an affinity value that indicates an affinity between the first application and a second application that is active on the apparatus; and causing the first application to launch on the apparatus according to the launch behavior.

In addition to any of the above described methods, any one or combination of: wherein the affinity value is predefined prior to said determining the launch behavior; wherein the affinity value indicates a high affinity between the first application and the second application, and wherein the launch behavior indicates that the first application is to be launched and presented concurrently with the second application; wherein the affinity value indicates a high affinity between the first application and the second application, and wherein the launch behavior indicates that the first application is to be launched such that a graphical user interface for the first application and a graphical user interface for the second application are concurrently visible; wherein the affinity value indicates a high affinity between the first application and the second application, and wherein the launch behavior indicates that the first application is to be launched such that a graphical user interface for the first application is presented on a first display device of the apparatus, and a graphical user interface for the second application is to be presented on a second display device of the apparatus; wherein the affinity value indicates a low affinity between the first application and the second application, and wherein the launch behavior indicates that the first application is to be launched such that a graphical user interface for the first application at least partially occludes a graphical user interface for the second application.

A computer-implemented method for causing an application group to launch based on a group launch event, the method including: ascertaining based on a grouping event that an application group is to be created that includes a first application and a second application, the grouping event being based on an indication of an affinity between the first application and the second application; causing an application group to be generated that includes the first application and the second application; detecting a group launch event indicating that applications of the application group are to be launched; and causing the first application and the second application to be launched based on the group launch event.

In addition to any of the above described methods, any one or combination of: wherein the indication of affinity between the first application and the second application includes an indication that the first application and the second application are frequently launched together; wherein the indication of affinity between the first application and the second application includes user feedback indicating that the first application and the second application are recommended to be executed together; wherein the indication of affinity between the first application and the second application is based on observed application-related activity of multiple users indicating that the first application and the second application are frequently launched together; wherein the group launch event includes a launch request for the first application, and wherein the method further includes: determining that the first application is included in multiple application groups; presenting a query that requests input to identify which application group of the multiple application groups is to be launched; and receiving input indicating that the application group is to be launched.

CONCLUSION

Techniques for application launching in a multi-display device are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
an apparatus having a first display device and a second display device physically connected to each other and hingeably moveable relative to each other about a hinge;
at least one processor; and
at least one computer-readable storage media storing instructions that are executable by the at least one processor to perform operations including:
ascertaining that an application is to be launched on the apparatus;
determining a launch behavior for the application based on an evaluation of context information indicating: a device positioning of the first display device relative to the second display device, and an application state, identifying one of a primary launch state for the application and a secondary launch state for the application, based on the device positioning; and
causing the application to launch on the apparatus according to the launch behavior.

2. A system as described in claim 1, wherein the device positioning is determined based on a device-based gesture that comprises a change in a relative angle between the first display device and the second display device.

3. A system as described in claim 1, wherein the device positioning is determined based on a device-based gesture that comprises an opening gesture of the first display device relative to the second display device.

4. A system as described in claim 1, wherein the device positioning is determined based on a device-based gesture that comprises an opening gesture of the first display device relative to the second display device, and wherein the launch behavior indicates that the application is to be launched on the first display device, and a second application is to be launched on the second display device.

5. A system as described in claim 1, wherein the context information further indicates: a functional configuration determination identifying that the first display device includes different hardware functionality from the second display device, and wherein the launch behavior indicates that the application is to be launched on the first display device based on the different hardware functionality of the first display device.

6. A system as described in claim 5, wherein the application is configured to utilize a particular hardware functionality, the functional configuration determination indicates that one of the first display device and the second display device includes the particular hardware functionality, and wherein the launch behavior indicates that the application is to be launched using the particular hardware functionality based on the functional configuration determination.

7. A system as described in claim 5, wherein the functional configuration determination indicates that the first display device is designated as an output primary, wherein the application state indicates that the application is an output primary application, and wherein the launch behavior indicates that the application is to launch on the first display device based on the functional configuration determination.

8. A system as described in claim 1, wherein the functional configuration indicates that the first display device is designated as an input primary, wherein the application state indicates that the application is an input primary application, and wherein the launch behavior indicates that the application is to launch on the first display device based on the functional configuration determination.

9. A system as described in claim 1, wherein the application state indicates that the application has a high affinity for a different application that is executing on the apparatus, and wherein the launch behavior indicates that the application is to be launched on the first display device and the different application is to be executed on the second display device.

10. A computer-implemented method, comprising:
determining that a first application is actively executing on an apparatus;
ascertaining that a second application is to be launched on the apparatus;
determining a launch behavior for the second application based on an affinity value that indicates an affinity between the first application and second application, wherein the affinity value is determined based on: a state of execution for the first application on the apparatus and display device data for one or more display devices associated with the apparatus; and
causing the first application to launch on the apparatus according to the launch behavior.

11. A method as described in claim 10, wherein the affinity value is predefined prior to said determining the launch behavior.

12. A method as described in claim 10, wherein the affinity value indicates a high affinity between the first application and the second application, and wherein the launch behavior indicates that the second application is to be launched and presented concurrently with the first application.

13. A method as described in claim 10, wherein the affinity value indicates a high affinity between the first application and the second application, and wherein the launch behavior indicates that the second application is to be launched such that a graphical user interface for the first application and a graphical user interface for the second application are concurrently visible.

14. A method as described in claim 10, wherein the affinity value indicates a high affinity between the first application and the second application, and wherein the launch behavior indicates that the second application is to be launched such that a graphical user interface for the first application is presented on a first display device of the apparatus, and a graphical user interface for the second application is to be presented on a second display device of the apparatus.

15. A method as described in claim 10, wherein the affinity value indicates a low affinity between the first application and the second application, and wherein the launch behavior indicates that the second application is to be launched such that a graphical user interface for the first application at least partially occludes a graphical user interface for the second application.

16. A computer-implemented method, comprising:
setting an affinity value that associates a state for launch of a first application with a state for launch of a second application relative to a detected display configuration of one or more display devices connected with an apparatus;
causing an application group to be generated that includes the first application and the second application;
detecting a group launch event indicating that applications of the application group are to be launched based on detection of the display configuration of the one or more display devices and the affinity value; and
causing the first application and the second application to be launched based on the group launch event.

17. A method as described in claim 16, wherein the state of launch of the first application and the state of launch of the second application are determined based on an indication of affinity between the first application and the second application indicating that the first application and the second application are frequently launched together in the detected device configuration.

18. A method as described in claim 16, wherein the state of launch of the first application and the state of launch of the second application are determined based on an indication of affinity between the first application and the second application indicating that the first application and the second application are recommended to be executed together in the detected device configuration.

19. A method as described in claim 16, wherein the state of launch of the first application and the state of launch of the second application are determined based on an indication of affinity between the first application and the second application indicating that the first application and the second application are frequently launched together in the detected device configuration.

20. A method as described in claim 16, wherein the group launch event includes a launch request for the first application, and wherein the method further comprises:
determining that the first application is included in multiple application groups;
presenting a query that requests input to identify which application group of the multiple application groups is to be launched; and
receiving input indicating that the application group is to be launched.

* * * * *